July 19, 1966 L. W. HAAKER ETAL 3,261,480
COMPACT MASTER-SLAVE MANIPULATOR
Filed Nov. 26, 1963 18 Sheets-Sheet 1

INVENTORS
LESTER W. HAAKER
DEMETRIUS G. JELATIS
CARLETON E. JENNRICH
By Moore, Whited Bend
ATTORNEYS

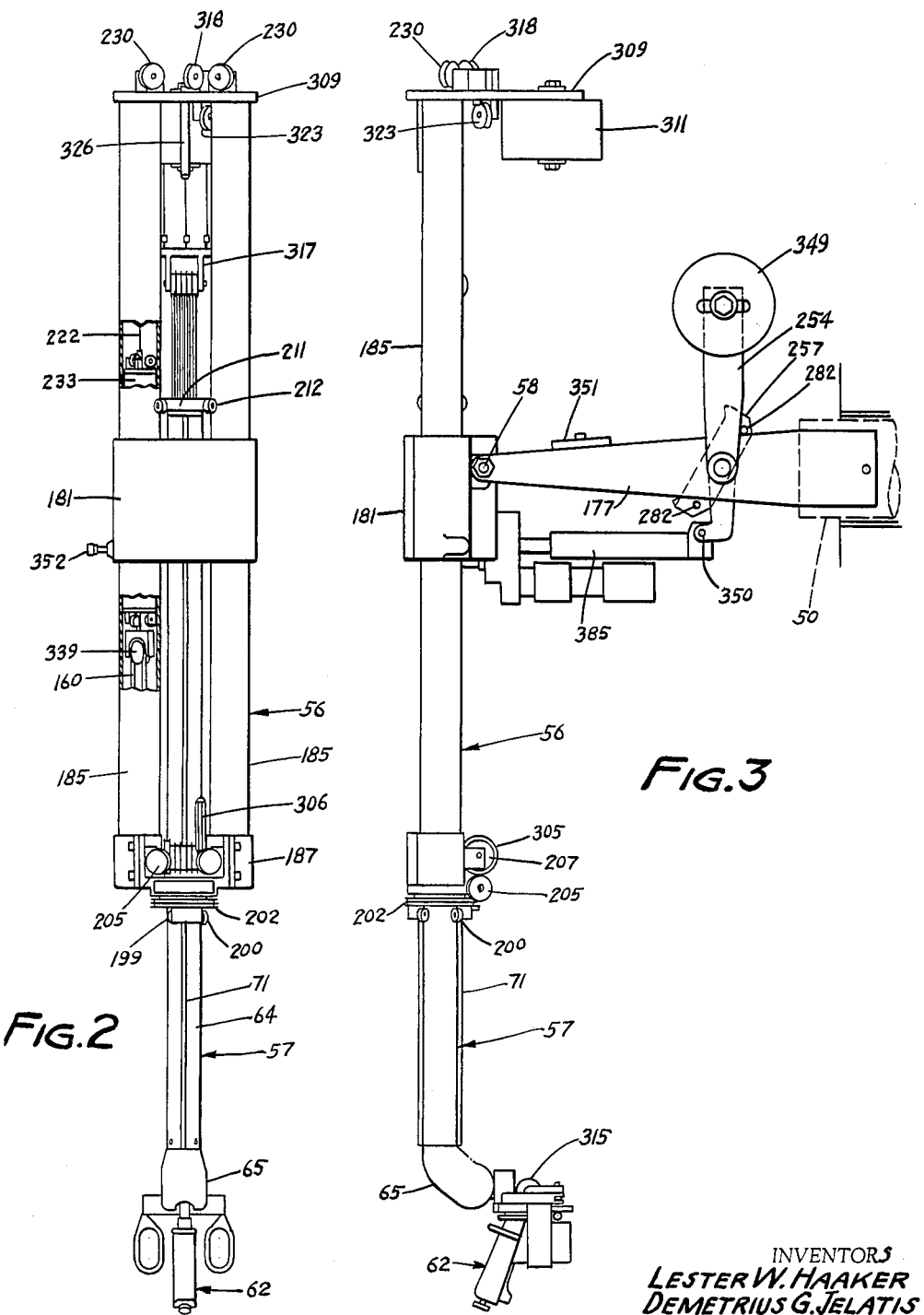

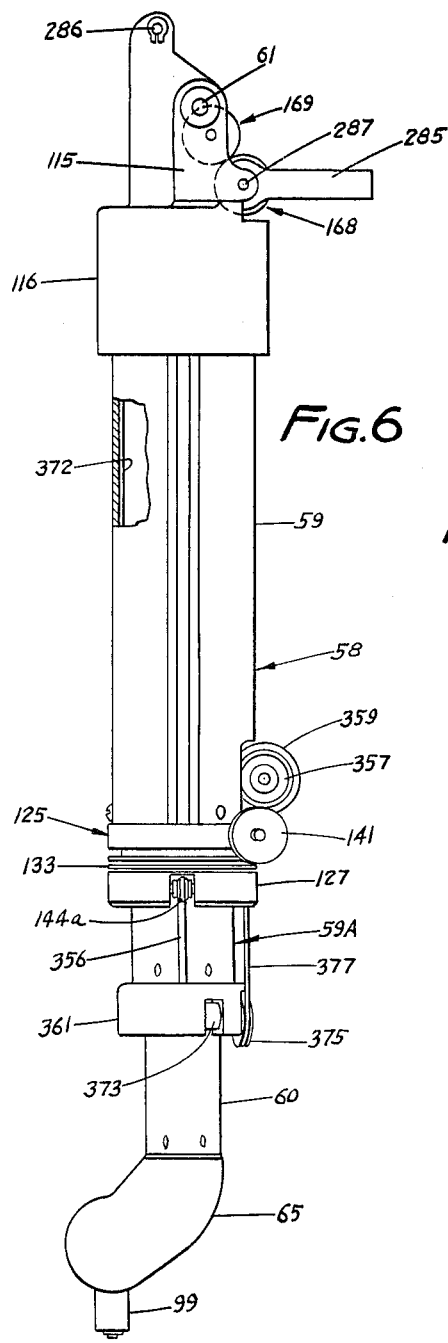
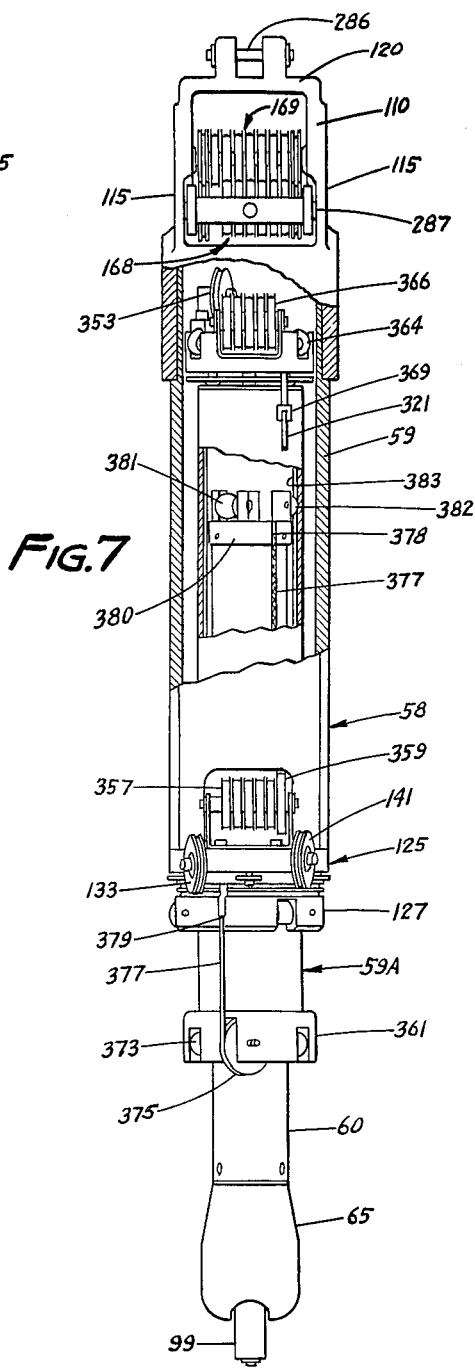

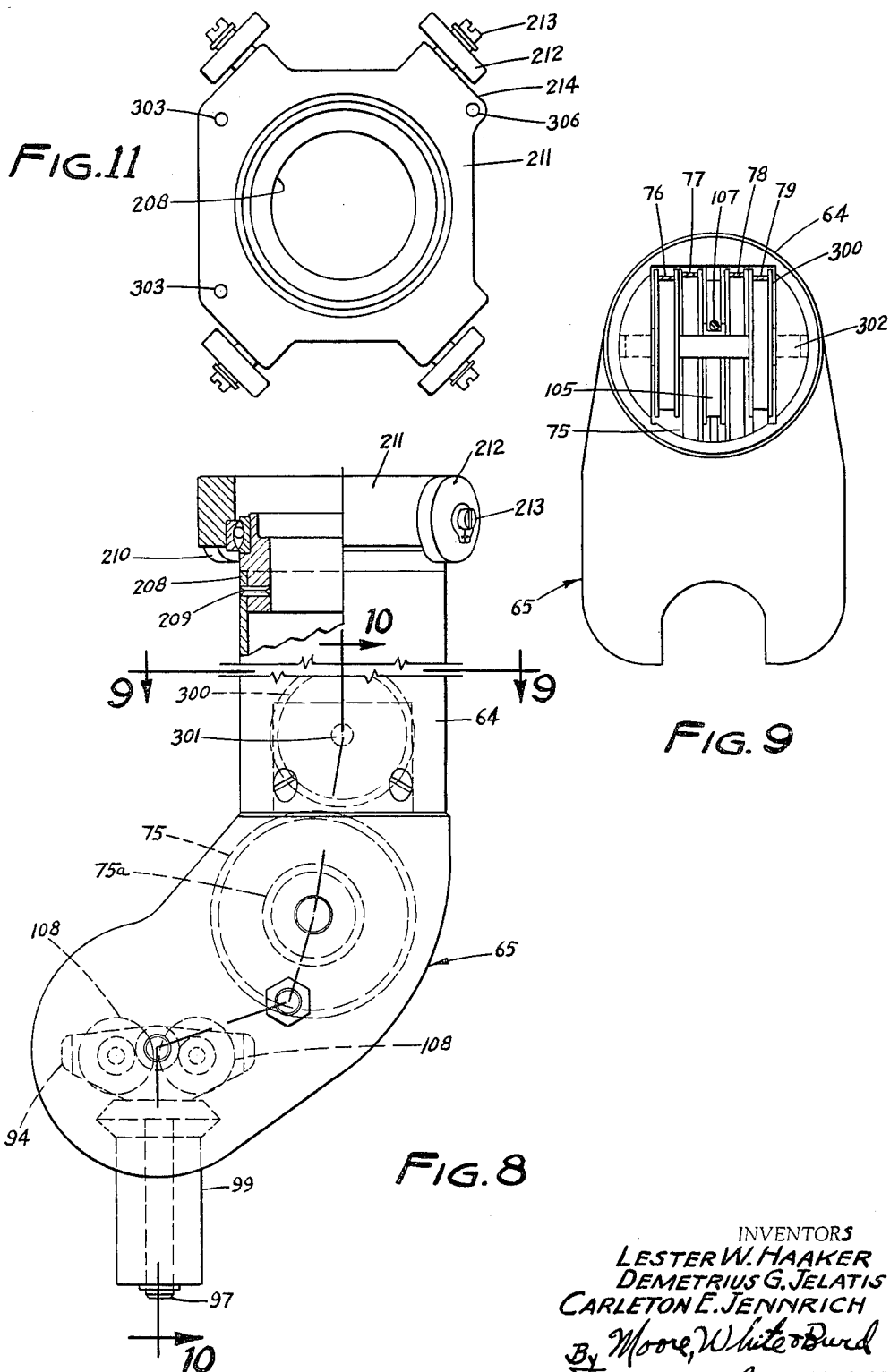

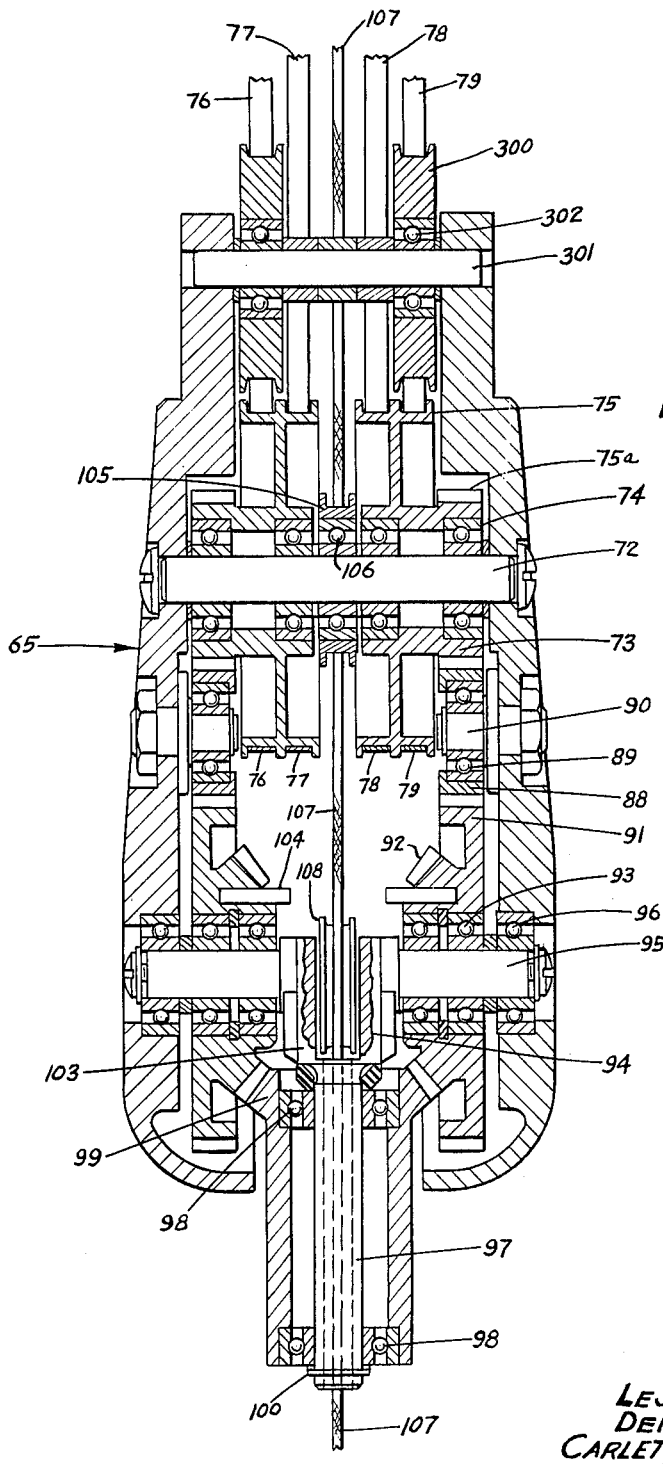

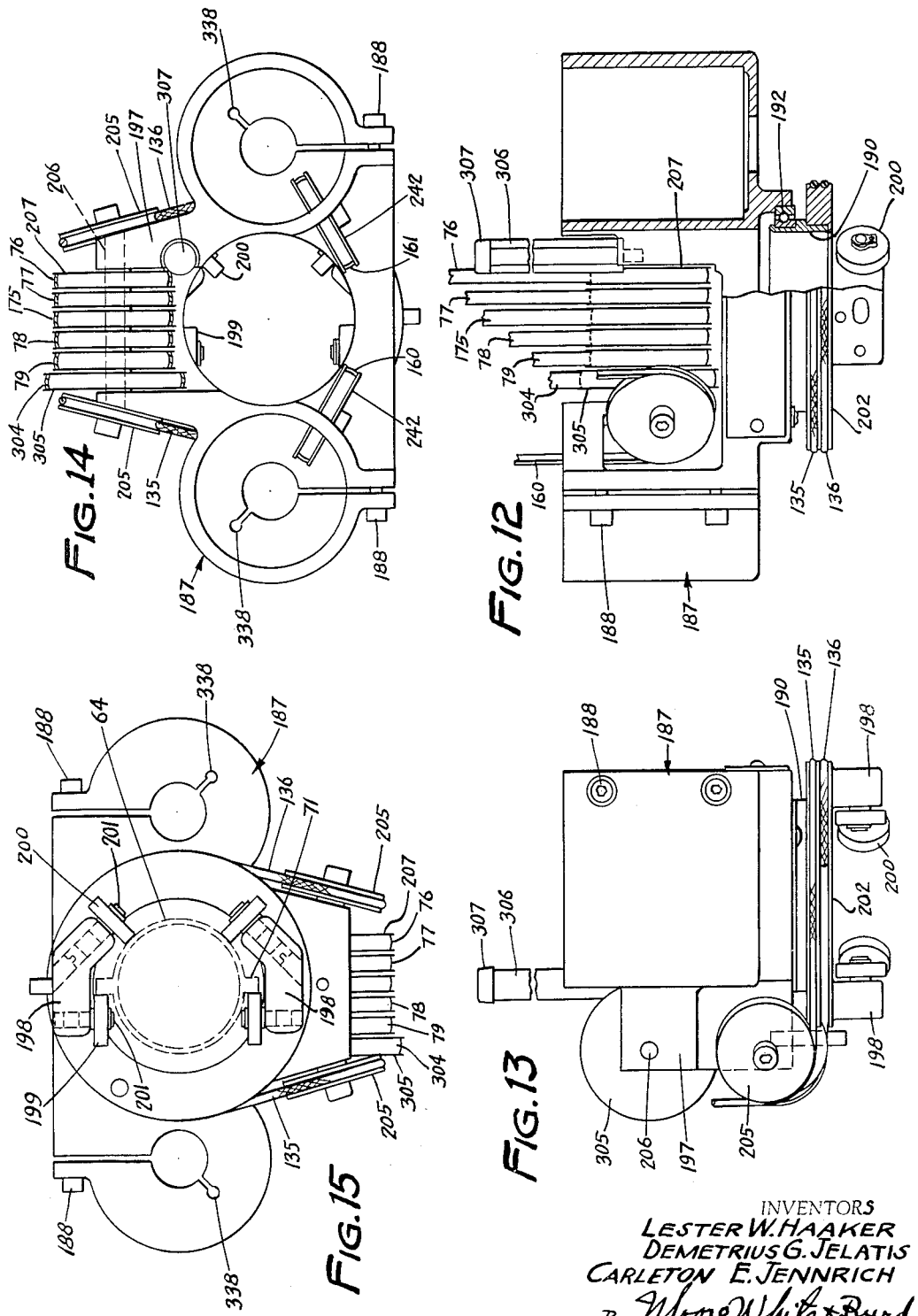

July 19, 1966

L. W. HAAKER ETAL 3,261,480

COMPACT MASTER-SLAVE MANIPULATOR

Filed Nov. 26, 1963

INVENTORS
LESTER W. HAAKER
DEMETRIUS G. JELATIS
CARLETON E. JENNRICH

By Moore, White & Burd

ATTORNEYS

July 19, 1966 L. W. HAAKER ETAL 3,261,480
COMPACT MASTER-SLAVE MANIPULATOR
Filed Nov. 26, 1963 18 Sheets-Sheet 10

INVENTORS
LESTER W. HAAKER
DEMETRIUS G. JELATIS
CARLETON E. JENNRICH
By Moore, White & Burd
ATTORNEYS July 19, 1966 L. W. HAAKER ETAL 3,261,480
COMPACT MASTER-SLAVE MANIPULATOR
Filed Nov. 26, 1963 18 Sheets-Sheet 11
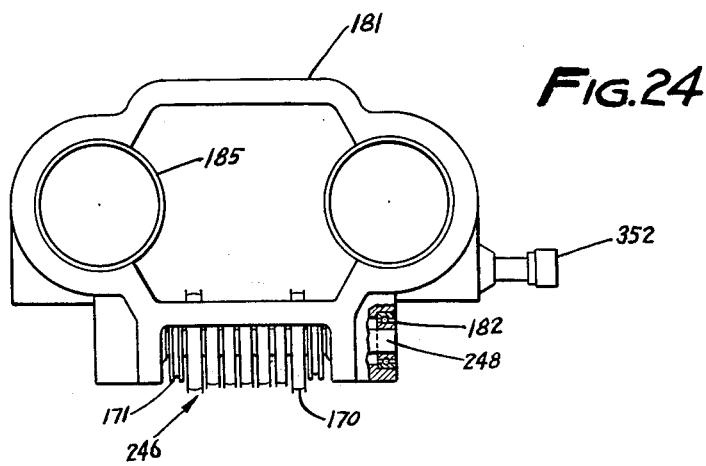
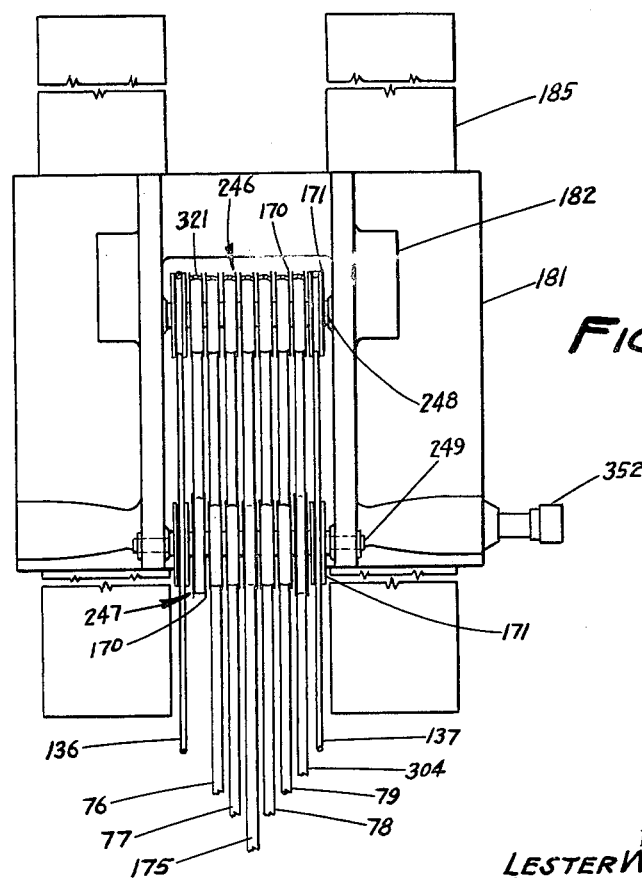
INVENTORS
LESTER W. HAAKER
DEMETRIUS G. JELATIS
CARLETON E. JENNRICH
By Moore, White & Bund
ATTORNEYS July 19, 1966   L. W. HAAKER ETAL   3,261,480
COMPACT MASTER-SLAVE MANIPULATOR
Filed Nov. 26, 1963   18 Sheets-Sheet 13

INVENTORS
LESTER W. HAAKER
DEMETRIUS G. JELATIS
CARLETON E. JENNRICH
Moore, Whites Burd
ATTORNEYS July 19, 1966 L. W. HAAKER ETAL 3,261,480
COMPACT MASTER-SLAVE MANIPULATOR
Filed Nov. 26, 1963 18 Sheets-Sheet 14
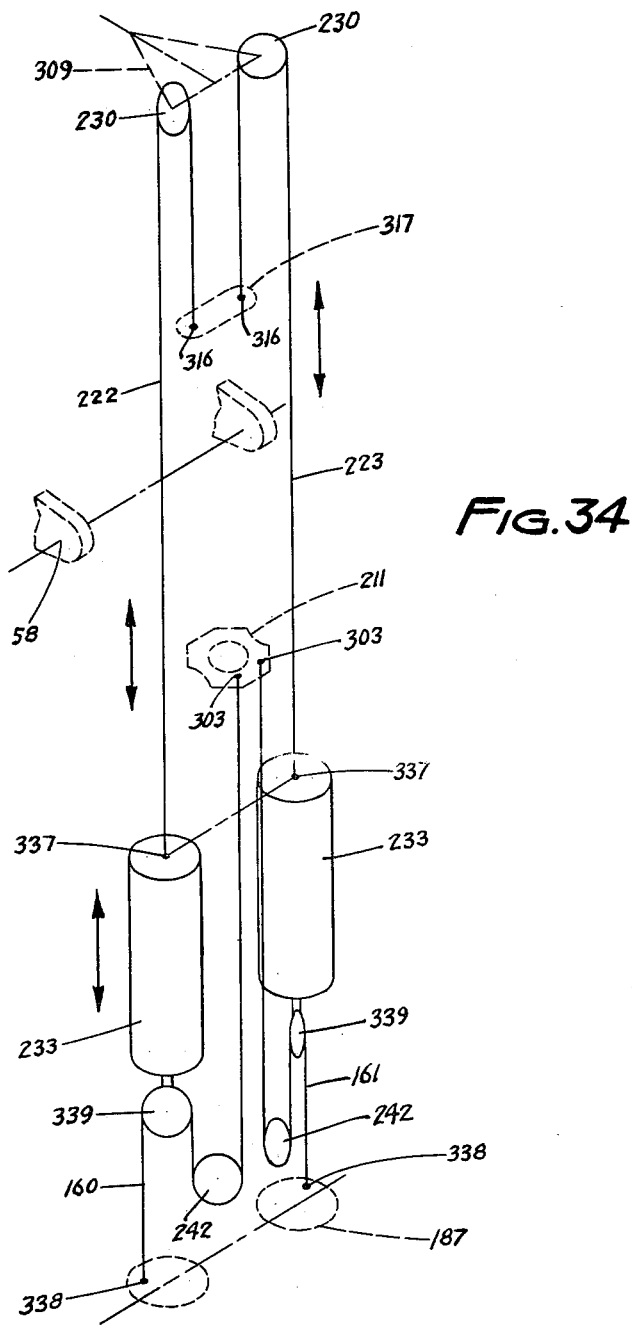
INVENTORS
LESTER W. HAAKER
DEMETRIUS G. JELATIS
CARLETON E. JENNRICH
By Moore, White & Burd
ATTORNEYS July 19, 1966  L. W. HAAKER ETAL  3,261,480
COMPACT MASTER-SLAVE MANIPULATOR
Filed Nov. 26, 1963  18 Sheets-Sheet 15

INVENTORS
LESTER W. HAAKER
DEMETRIUS G. JELATIS
CARLETON E. JENNRICH
By Moore, White & Burd
ATTORNEYS United States Patent Office 3,261,480
Patented July 19, 1966

3,261,480
COMPACT MASTER-SLAVE MANIPULATOR
Lester W. Haaker, Demetrius G. Jelatis, and Carleton E. Jennrich, Red Wing, Minn., assignors to Central Research Laboratories, Inc., Red Wing, Minn., a corporation of Minnesota
Filed Nov. 26, 1963, Ser. No. 325,921
8 Claims. (Cl. 214—1)

This invention relates to a compact remote control master-slave manipulator of the type which is used by an operator to perform certain manipulative functions in some area remote from the operator as, for example, on the opposite side of shielding wall. Manipulators of this general type are well-known and widely used, but in most installations, they require considerable headroom on both sides of the shielding wall to provide an adequate operating range. This is particularly true in the slave cell where the high cost of providing shielding tends to limit wall and ceiling heights.

The manipulator according to the present invention is a maximum performance manipulator designed for minimum space requirements and intended for long rugged-duty trouble-free service. It is engineered specifically for applications that require a low mounting height and installation under low ceilings or in "junior hot cells." It is a full range manipulator of high capacity. Complete and true 1 to 1 handle-to-tong master-slave relationships in magnitude and sense are maintained for all motions, including true vertical relationships.

The invention is illustrated by the accompanying drawings in which the same numerals refer to corresponding parts and in which:

FIGURE 2 is a front elevation of the master arm assembly;

FIGURE 3 is a right side elevation of the master arm assembly;

FIGURE 6 is a left side elevation of the slave arm assembly;

FIGURE 7 is a front elevation (as viewed by the operator) of the slave arm assembly;

FIGURE 8 is a left side elevation of the master arm boom tube and wrist joint assembly;

FIGURE 9 is a top plan of the wrist joint assembly shown as a section on the line 9—9 of FIGURE 8 and in the direction of the arrows;

FIGURE 10 is an extended section of the wrist joint assembly on the line 10—10 of FIGURE 8 and in the direction of the arrows;

FIGURE 11 is a plan view of the top of the master arm boom tube;

FIGURE 12 is a front elevation, partly in section, of the master arm azimuth assembly;

FIGURE 13 is a left side elevation of the master arm azimuth assembly;

FIGURE 14 is a top plan view of the master arm azimuth assembly;

FIGURE 15 is a bottom plan view of the master arm azimuth assembly;

FIGURE 24 is a top plan view of the master pivot assembly;

FIGURE 25 is a rear elevation of the master pivot assembly;

FIGURE 34 is a schematic perspective view showing how the boom tube of the master arm is counterbalanced for vertical movement relative to the stationary portion of the arm;

Figure 37:
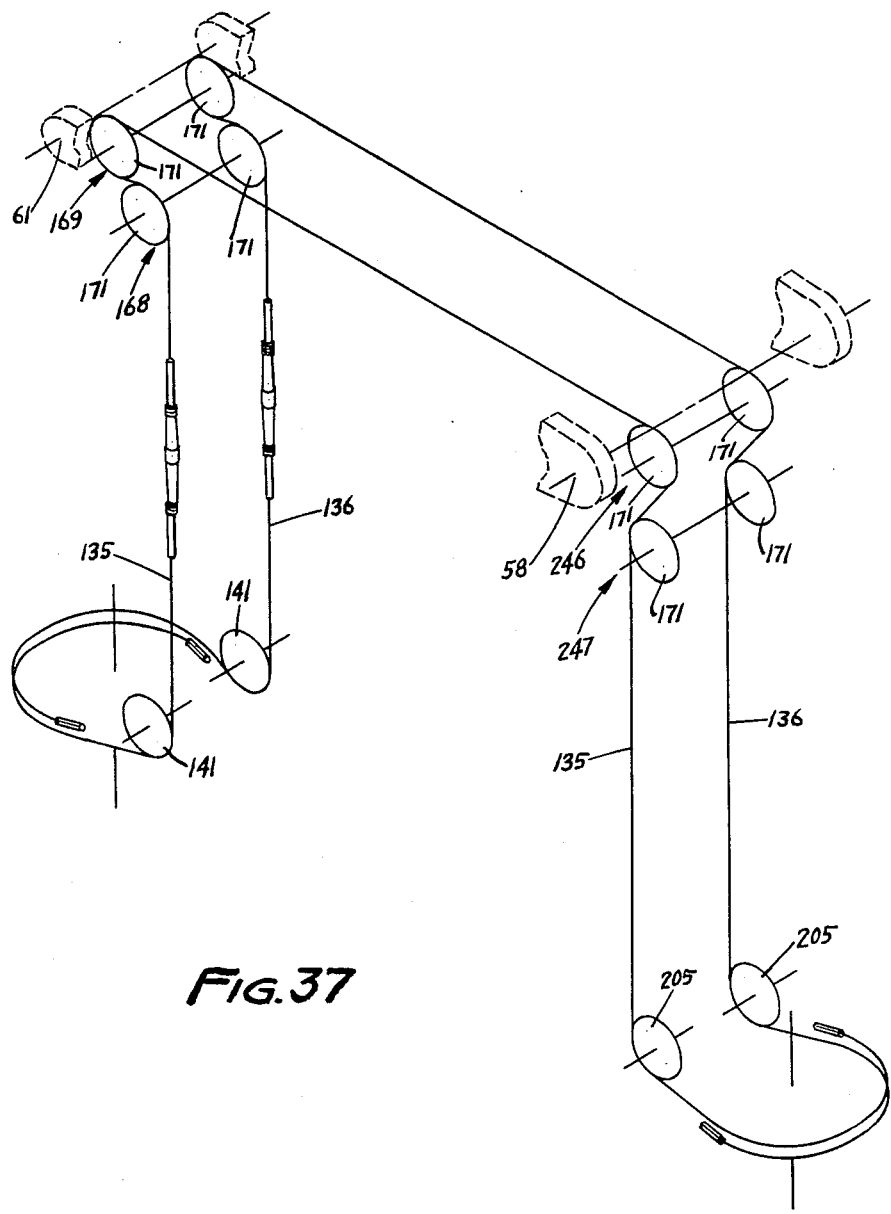
Figure 38:
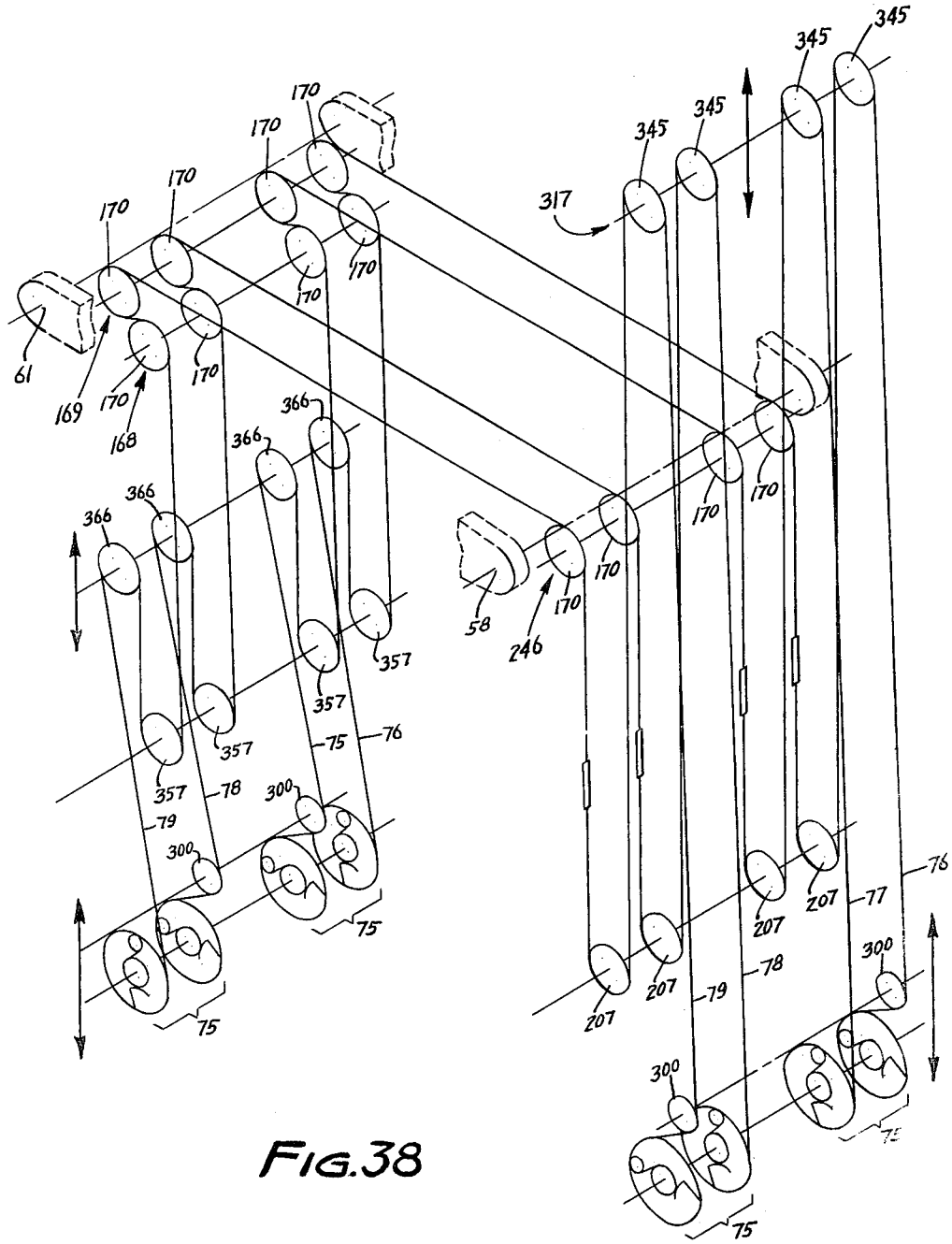

FIGURE 37 is a schematic perspective view showing azimuth means by which rotation of the handle about the longitudinal axis of the master arm produces a corresponding rotation of the tongs about the longitudinal axis of the slave arm; and FIGURE 38 is a schematic perspective view showing elevation and twist means by which rotation of the handle carried by the master arm about its own two axes produces corresponding rotation of the tongs on the slave arm.

Throughout this application the manipulator is described and illustrated in terms of a support with a single master arm and a single slave arm. It is to be understood, however, that in virtually all instances the manipulators are employed in spaced pairs so that the operator by the use of two master arms is able to manipulate two slave arms in order to reproduce the actions of a pair of hands in the remote area on the opposite side of the barrier wall.

GENERAL ASSEMBLY OF PARTS (FIGURE 1)

Figure 1:
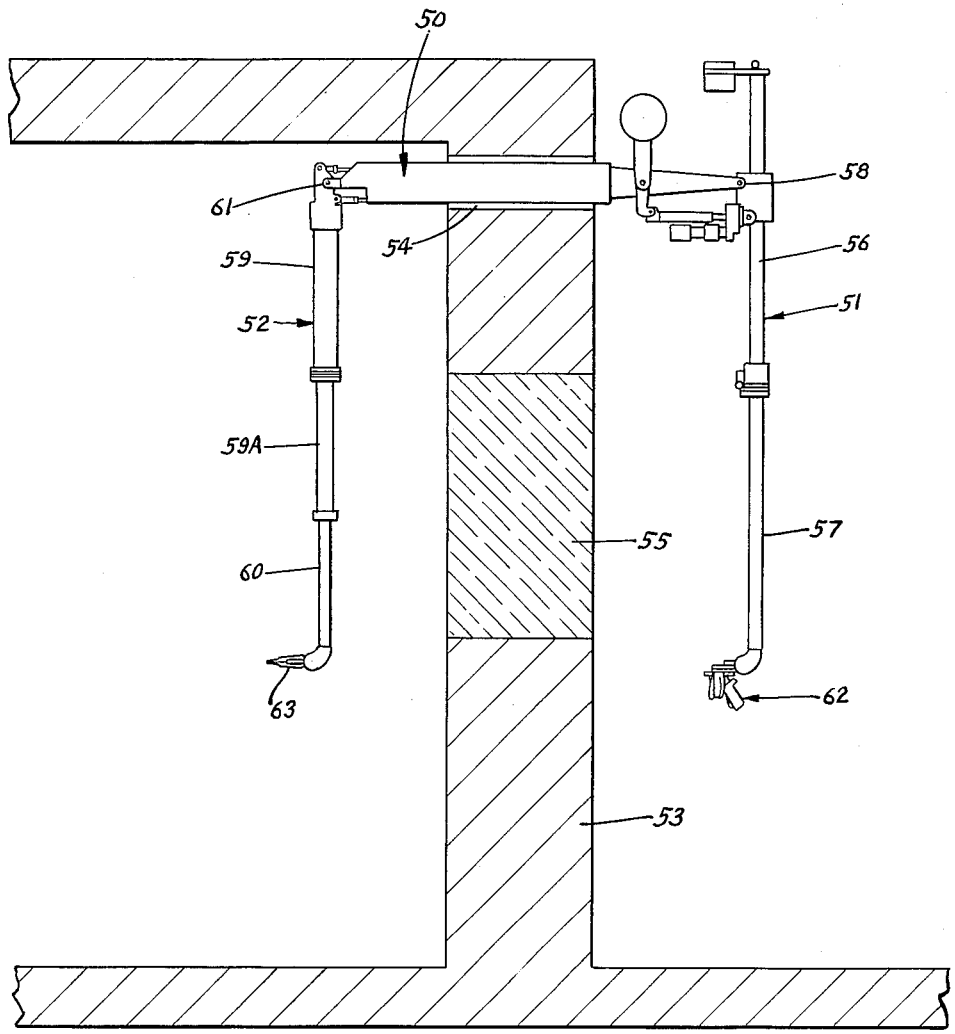
FIGURE 1 is a left side elevation (from the viewpoint of the operator) showing the assembled compact manipulator according to the present invention installed in a wall.

Referring now to the drawings and particularly to FIGURE 1, the compact remote control manipulator of the present invention comprises generally a horizontal tubular support 50, a master arm 51 and a slave arm 52.

The horizontal support 50 extends through a generally vertical shielding wall 53, being mounted therein for rotation in a sleeve or tube 54 set in the wall. As is well understood, the thickness of the wall and the material of which it is composed will depend upon the shielding purpose of the wall. The wall is provided with a window 55 through which the operator in a safe area to the right of the wall may observe the manipulative movements of the slave arm in the dangerous area or hot cell to the left of the wall.

For convenience in describing the present invention, insofar as possible, the same numbering system is employed to designate corresponding parts as is used in United States Patent No. 2,764,301 issued on September 25, 1956, to Goertz et al. and United States Patent No. 2,771,199 issued on November 20, 1956, to Jelatis. The subject matter of these patents is incorporated herein by reference to the extent that might be necessary to fully under stand that structure and those movements held in common between the present manipulator and those of the prior patents, in order to avoid burdening the present application with disclosure of subject matter old in the art.

THE MASTER ARM
(FIGURES 1, 2 and 3)

The master arm 51 comprises a dual tubular trunk tube 56 which is stationary so far as relative vertical movement is concerned, but is pivotally connected at 58 to the horizontal support. The master arm also includes a movable boom tube 57 which is slidable longitudinally relative to the trunk tube portion to move toward and away from the pivot. A handle 62 at the lower end of the master arm boom tube is engaged by the hand of the operator and by appropriate movements which are transmitted along the arm 51 and the support 50 and slave arm 52 controls the movement of a claw or tong 63 connected to the lower end of the boom tube 60 of the slave arm.

The handle means whose construction and operation are described generally in Goertz United States patent No. 2,695,715 issued November 30, 1954 is adapted for use in the present manipulator. The details of construction of the handle accordingly are not repeated here. An improved handle means also adapted for use in connection with the present manipulator is described and claimed in copending United States application Serial No. 351,964 filed March 16, 1964 by Gordon M. Lee.

Figure 4:
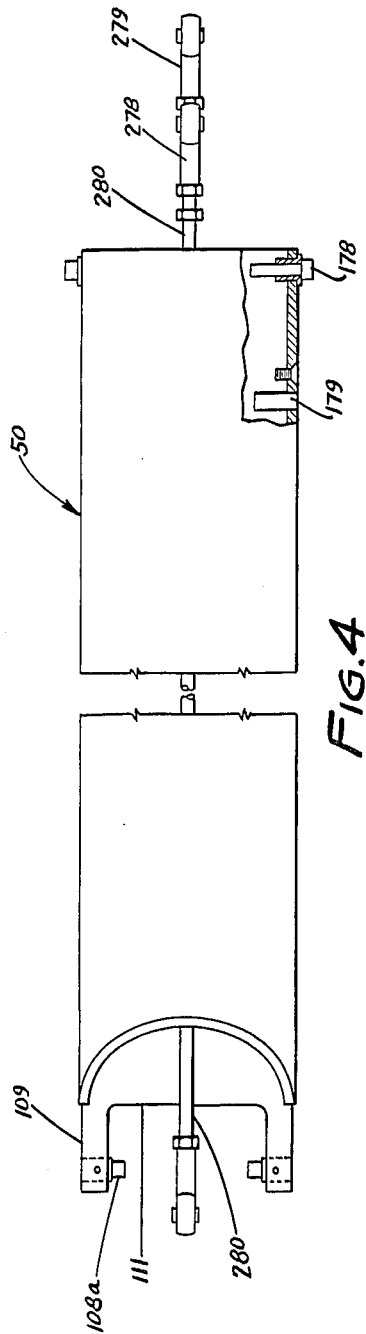
FIGURE 4 is a top plan of the through tube and tie rod assembly.
Figure 5:
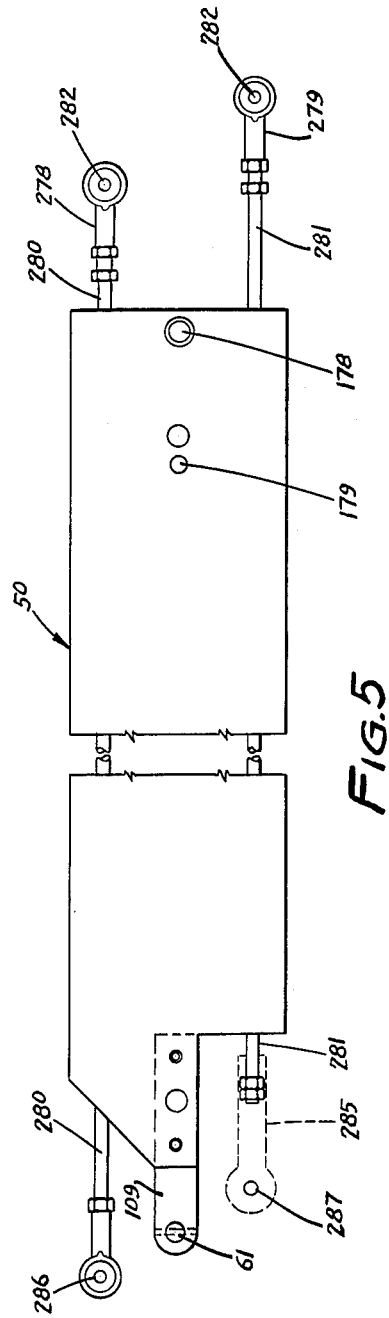
FIGURE 5 is a left side elevation of the through tube and tie rod assembly.
Figure 17:
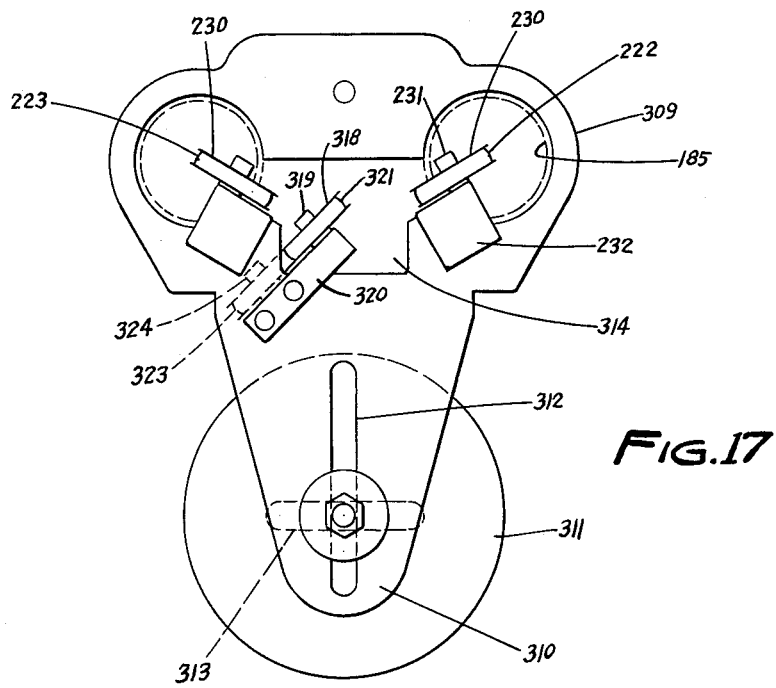
FIGURE 17 is a top plan view of the master arm counterweight bracket assembly.
Figure 16:
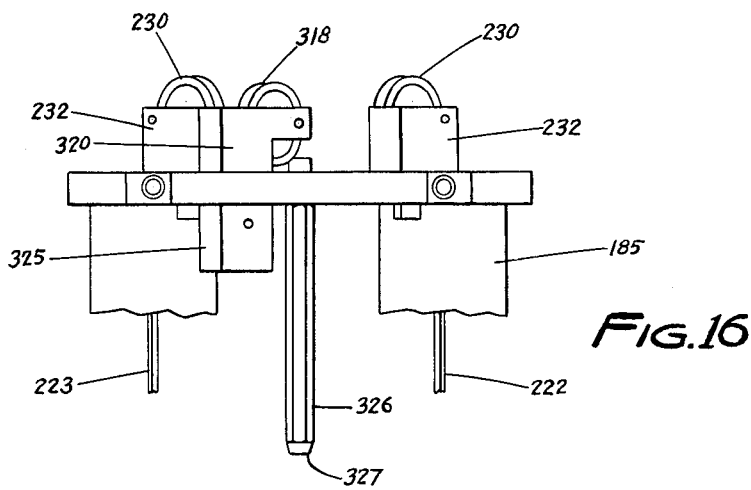
FIGURE 16 is a rear elevation, with counterweight removed, of the master arm counterweight bracket assembly.

THROUGH TUBE AND TIE ROD ASSEMBLY
(FIGURES 1, 4 and 5)

The horizontal support 50 is rotatable within tube 54 about their common longitudinal axis to permit side to side movements of the master arm (or X motion) to be imparted to the slave arm. Horizontal support 50 is tubular so as to provide a passage for linear motion transmitting means from one side of the shielding wall to the other. Movement of the master arm toward and away from the protective wall (or Y motion) is transmitted to the slave arm through the horizontal support 50 by means of a pair of upper and lower links or tie rods 280 and 281, respectively. The tie rods 280 and 281 are provided with fittings 278 and 279, respectively, for pivotal connection between the master arm rocker element and the tie rods as hereinafter described. The opposite ends of the tie rods are provided with fittings 284 and 285 by means of which the tie rods are pivotally connected to the slave arm, as hereinafter described. The slave arm pivot 61 is formed by a pair of stub shafts 108a carried by a pair of ears 109 which form a part of a yoke 111 secured within the slave end of the horizontal support 50.

THE SLAVE ARM
(FIGURES 1, 6 and 7)

The slave arm 52 comprises a tubular trunk tube portion 59 which is stationary relative to vertical movement. The slave arm of the present manipulator includes an intermediate tube 59A which fits telescopically within the slave trunk tube 59 and is movable longitudinally relative to the trunk tube. A slave boom tube 60 is fitted telescopically within the intermediate tube 59A and is movable longitudinally relative to the intermediate tube. The slave arm trunk tube 59 is pivotally connected at 61 to the horizontal support.

MASTER ARM BOOM TUBE WITH WRIST JOINT ASSEMBLY
(FIGURES 2, 3, 8, 9, 10 and 11)

The master arm boom tube 57 includes an elongated tube 64, the lower end of which carries a housing 65 for the wrist joint. The housing 65 is formed of complementary halves which are secured to one another by suitable fastening means. The opposite walls of the housing receive the ends of shaft 72 on which is mounted a pair of tubular members 73 by means of two pairs of ball bearings 74. Each tubular member 73 has a pair of take-up sections 75 and a spur gear section 75a. The four take-up sections 75 in the form of a grooved drum or pulley receive four metal tapes 76, 77, 78 and 79 which have their ends anchored in the take-up sections. These tapes transmit elevation and twist motions. Tapes 76 and 79 extend in one direction around the take-up members and tapes 77 and 78 are wrapped in opposite directions around the take-up members. The spur gear sections 75a of the tubular members 73 mesh with idler gears 88 journaled by means of ball gearings 89 on shafts 90 supported in the housing.

Idlers 88 in turn mesh with spur gears 91 which are secured to beveled differential gears 92 journaled by two pairs of ball bearings 93 on trunnions 95 of yoke 94. Trunnions 95 are journaled in the housing by means of ball bearings 96. The yoke 94 also has a shaft 97 which by means of two ball bearings 98 journals a bevel gear 99 which is in mesh with the differential gears 92 whose gear ratio is approximately 1:1 in order to provide about equal stiffness in both the elevation and twist motions. The bevel gear 99 is held in mesh with the differential gears by means of a snap ring 100 which is at the lower side of the lower ball bearing 98.

Angular movement of the yoke 94 about the trunnions 95 is limited by means of the dimensions of the opening in the housing through which the shank of bevel gear 99 extends. The wrist joints of the slave arm are of similar construction. The handle 62 or the tongs 63 is secured to the shank of the bevel gear. Projections 103, which are cast into the yoke, lie in the path of pegs 104 which are set in the differential gears 92. Engagement of the pegs 104 with the projections 103 limits the angular movement of the differential gears 92 in both directions and, since the take-up sections 75 are geared to the differential gears 92, the angular movement of the take-up sections is limited, with corresponding limit of tape movement.

A guide pulley 105 is journaled on the shaft 72 by means of ball bearing 106 between the tubular members 73. The pulley 105 is engaged by tong cable 107 which extends thereover, being guided between two guide pulleys 108 journaled by ball bearings on the yoke 94. The cable 107 extends from the pulleys 108 through the hollow shaft 97 of the yoke 94 to the cable pulley 315 or handle 62, in the case of the master arm wrist joint. The corresponding cable 107a similarly extends from the slave arm wrist joint to operate the tong means, as more fully described hereinafter. A pair of guide pulleys 300 for tapes 76 and 79 are journaled on a shaft 301 in the top of the wrist joint housing by means of ball bearings 302.

The top end of tubular boom tube 64 is provided with an annular extension 208 secured by fastening means 209 and supporting a bearing 210, which in turn supports an annular boom tube head 211. The head member 211 is provided with a plurality of rollers 212 which are adapted to engage tubular guides 185 of the master arm trunk tube 56 so as to permit the head 211 to have generally vertical movement along the tubular guides while preventing the head from rotating with respect to the guide. The rollers 212 are journaled on shafts 213 which are mounted on bosses 214 on the head 211. The connection of the upper end of the tubular structure 64 of the master arm with the head 211 through the extension 208 and the bearing 210 is such as to permit rotational movement of the tubular boom tube with respect to the head while preventing axial movement of the tubular structure with respect to the head. The head member is also provided with anchorage ports 303 and 306 to receive the fittings securing the ends of the counterweight tapes 160 and 161 and Z motion tape 304, respectively.

MASTER ARM AZIMUTH ASSEMBLY

(FIGURES 2, 3, 12, 13, 14 and 15)

As shown in FIGURES 12 to 15, a bracket 187 is secured to the lower ends of the tubular guides 185 which comprise part of the master arm trunk tube by means of clamping screws 188. A ring or rotating body 190 is rotatably mounted in the lower central portion of the bracket 187 by means of bearing 192. The rotary body 190 has two axially extending projections 198, each of which carries rollers 199 and 200, each mounted on a shaft 201. On each extension 198 the rollers 199 and 200 extend at approximately 45 degree angles to one another and rollers 199 engage the sides of the vertical ribs 71 formed in the tubular portion 64 of the master arm boom tube 57. Thus, the rollers 199 and 200 constitute keys that permit axial movement of the master arm boom tube with respect to the rotary body 190 while preventing rotational movement of the boom tube with respect to the rotating body.

The azimuth assembly includes a cable take-up portion in the form of a double grooved pulley 202 mounted for rotation with rotating ring member 190. The ends of azimuth motion cables 135 and 136 are received in the grooves of the double grooved take-up pulleys 202. The cables whose ends are anchored in pulley 202 extend around the pulley in opposite directions and then extend over grooved guide pulleys 205 and, thence, upward toward pivot 58 of the master arm on the horizontal support.

The elevation and twist motion tapes 76, 77, 78 and 79 and tong tape 175 from the master arm wrist joint run over pulleys 207 which are journaled to rotate on shaft 206 mounted in ears 197 of bracket 187. Guide pulleys 242 are journaled for rotation in azimuth bracket 187 for the purpose of receiving master arm Z motion counterweight tapes 160 and 161 in their paths from their anchorages at 338 in bracket 187, around guide pulleys 339 and downwardly through the lower ends of tubular members 185 and then guide these tapes upwardly to their anchorages 303 in annular head 211 at the top of the master arm boom tube.

Z motion tape 304 which transmits vertical movement of the master arm to the slave arm passes around a further pulley 305 mounted on shaft 206 with pulleys 207 in the path of the tape from its anchorage in head 211 at the top of the master arm boom tube. Tape 304 extends downwardly along the back of the boom tube around pulley 305 and then back upwardly towards the master pivot 58. A vertically extending bumper member 306 provided with a resilient pad or tip 307 of rubber or other similar material is mounted on the upper surface of azimuth assembly 187 in the path of the angular head 211 at the top of the master boom tube to limit the extent of movement of that member.

MASTER ARM COUNTERWEIGHT ASSEMBLY

(FIGURES 2, 3, 16 and 17)

A counterweight bracket 309 is supported at the top ends of the dual tubular guides 185 of the master arm trunk tube. The counterweight bracket is provided with a rearwardly projecting extension 310 from which a counterweight 311 of suitable size and weight to partially counter balance the master arm is suspended. Slots 312 and 313 are provided in the bracket extension 310 and counterweight 311, respectively, to permit adjustment of the position of the counterweight. A central opening 314 in the counterweight bracket overlies the top of the vertically movable master arm boom tube between the trunk tube tubular guides 185. A pair of guide pulleys 230 journaled on shafts 231 carried by posts 232 on the top side of the counterweight bracket are positioned so that one side of the pulley overlies the hollow tubular support 185 and the other side overlies the central opening.

Counterweight tapes 222 and 223 each extend from an elongated counterweight assembly 233 located within one of the tubular guides 185, up and over the guide pulley 230 to an anchorage 316 in a half speed carriage assembly 317, which is described in greater detail hereinafter. A further guide pulley 318 is journaled for rotation on a shaft 319 supported by post 320 on the upper portion of the counterweight bracket above the central opening.

Z motion tape 321 extends up through opening 314, around pulley 318 and back down through opening 314 to an anchorage 322 in the half speed carriage 317. A further guide pulley is journaled for rotation on shaft 324 extending from a post 325 projecting downwardly from the bottom surface of the counterweight bracket to maintain the tape in alignment. A further bumper 326 provided with a resilient tip 327 projects downwardly from the bottom surface of the counterweight bracket in the path of the head of the master arm boom tube in order to limit the upward movement of the boom tube.

Z MOTION COUNTERWEIGHT ASSEMBLY

Figure 18:
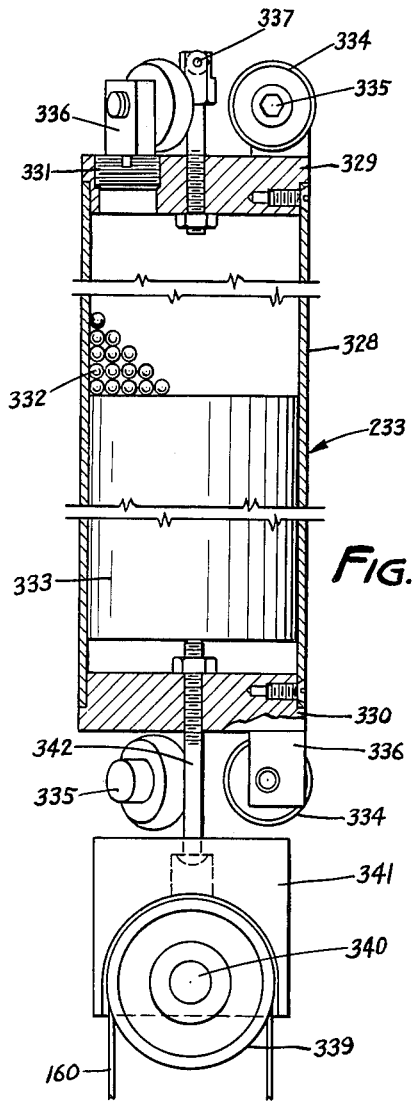
FIGURE 18 is an elevation, partly in section, of the Z motion counterweight assembly of the master arm.
Figure 19:
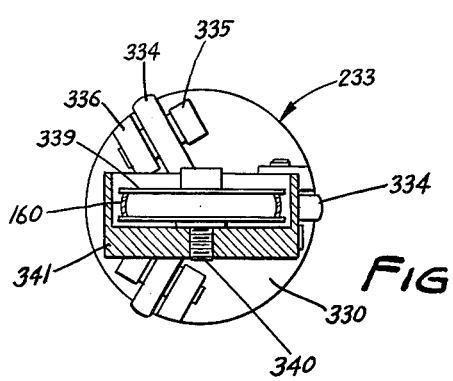
FIGURE 19 is a bottom view of the Z motion counterweight assembly.

(FIGURES 2, 18 and 19)

The Z motion counterweight assembly 233 is positioned in each of the guide members 185 of the master arm trunk for movement therein. Each counterweight assembly 233 comprises an elongated hollow tubular member 328 closed at its opposite ends by an upper end member 329 and a lower end member 330. The upper and lower end members are of similar construction except that the upper member 329 is provided with an opening which is closed by a plug 331 for the introduction of lead shot 332. Preferably the tube 328 is partially filled by a solid lead cylinder 333 and additional weight as needed is introduced in the form of shot.

The upper and lower end members of the counterweight assembly are provided with a plurality of rollers 334 each adapted to rotate on a shaft 335 extending from a post 336 projecting from the surface of the end member. The rollers 334 are substantially uniformly spaced about the periphery of the counterweight end members and project slightly beyond that periphery to bear against the inner cylindrical walls of the tubular guide numbers 185.

One end of counterweight tapes 222 and 223 is attached to an anchor means 337 centrally disposed in the upper counterweight end member of each of the counterweight assemblies. A pulley 339 is journaled to rotate on shaft 340 mounted in pulley block 341 which is suspended below the bottom of the lower counterweight end member 330 by means of a bolt 342. Z motion counterweight tapes 160 and 161 extend around pulley 339 in their paths from their anchorages 338 in the azimuth bracket 187 to guide pulleys 242 in the azimuth assembly and then upwardly to their anchorages 303 in the head at the top of the boom tube.

VARIABLE SPEED CARRIAGE

Figure 20:
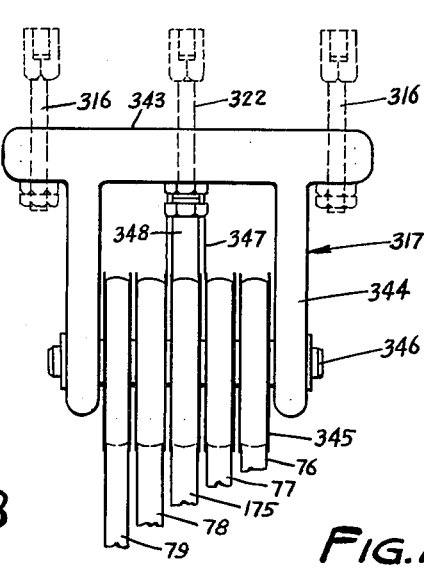
FIGURE 20 is a front elevation of the half speed carriage assembly of the master arm.
Figure 21:
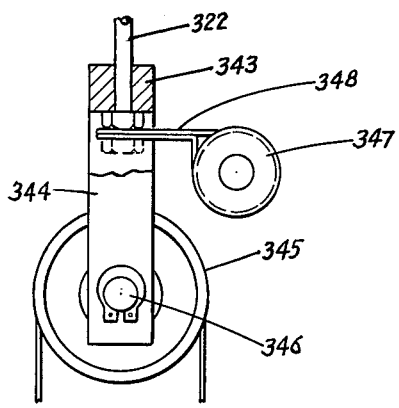
FIGURE 21 is a right side elevation of the master arm half speed carriage.

(FIGURES 2, 20 and 21)

In the illustrated form of manipulator according to the present invention, a half-speed carriage 317 is mounted in the space between the tubular guides 185 of the master arm trunk and between the top of the annular head 211 of the master arm boom tube and the bottom surface of counterweight bracket 309. The half-speed carriage assembly is in the form of a yoke having a horizontal bar 343 and a pair of spaced apart downwardly extending legs 344. The half-speed carriage assembly is supported by being suspended from the Z motion counterweight tapes 222 and 223 which are anchored at 316 to the top bar 343 of the carriage assembly and by Z motion tape 321 which is anchored at 322 in the center of the horizontal bar.

A plurality of pulleys 345 are journaled to rotate on a shaft 346 between the legs 344 of the half-speed carriage. The elevation and twist motion tapes 76, 77, 78, and 79 and tong tape 175 pass up and over pulleys 345 in their paths between the master arm wrist joint and the pulley bank of the master arm azimuth assembly. The result is that the boom tube is suspended from the half-speed carriage which in turn is suspended from the counterweight bracket and the boom tube is counterbalanced by means of the counterweight assembly 233. An optional guide member 347 is supported from the bottom edge of the horizontal bar portion of the half-speed carriage by means of a bracket 348 for the purpose of guiding an electrical cable used to power electrical assist means optionally incorporated into the manipulator.

MASTER ARM EARS AND ROCKER AND PIVOT ASSEMBLIES

(FIGURES 2, 3, 22, 23, 24 and 25)

Figure 23:
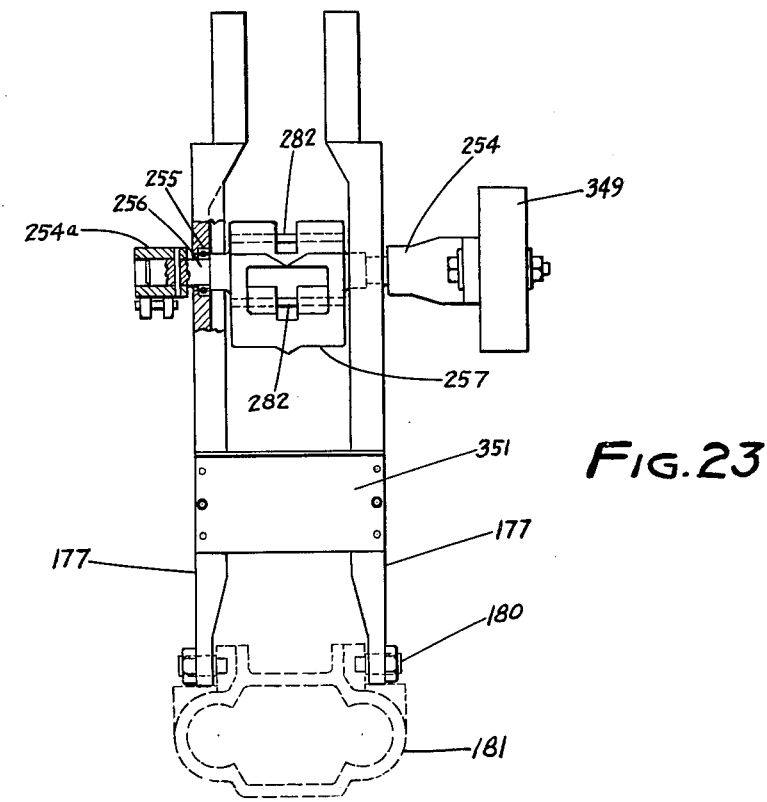
FIGURE 23 is a top plan view of the master ears and rocker assembly.
Figure 22:
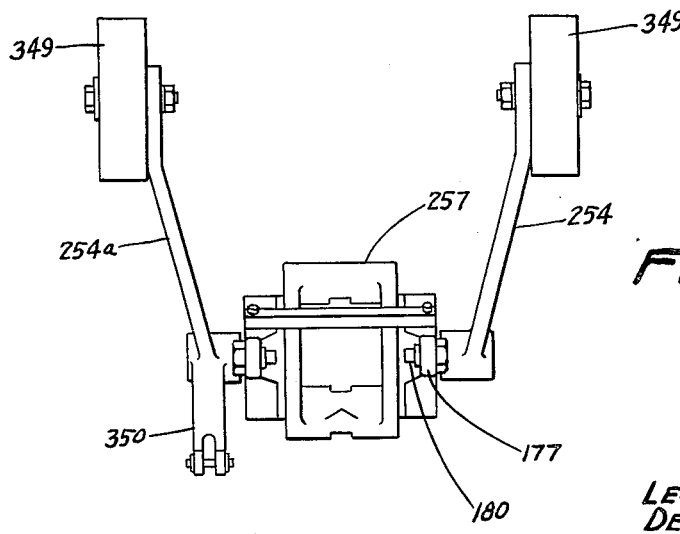
FIGURE 22 is a front elevation of the master pivot ears and rocker assembly.
Figure 32:
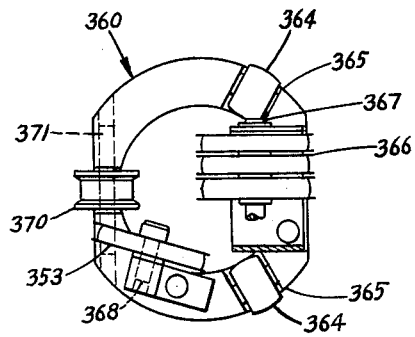
FIGURE 32 is a top plan view of the intermediate tube assembly.
Figure 27:
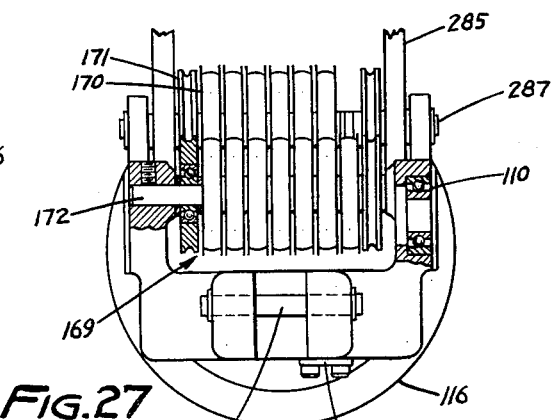
FIGURE 27 is a top plan of the slave pivot assembly.
Figure 31:
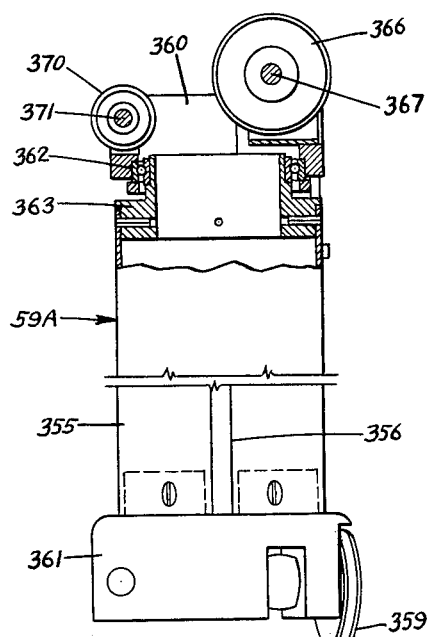
FIGURE 31 is a left elevation, partly in section, of the intermediate tube assembly of the slave arm.
Figure 26:
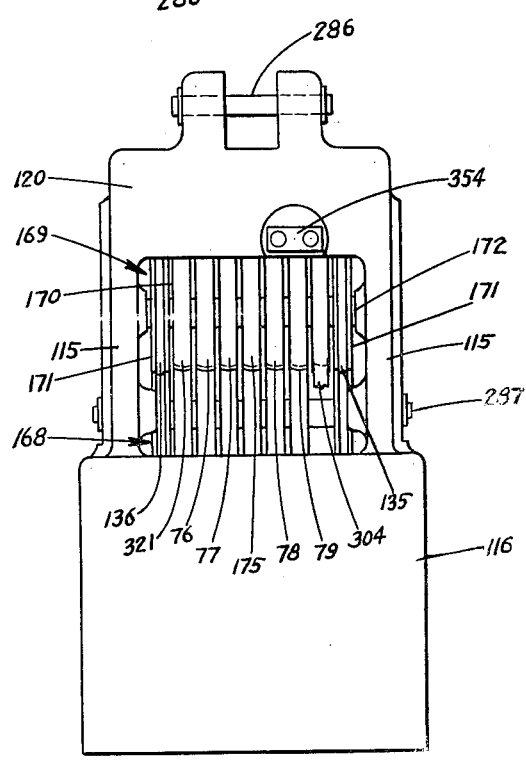
FIGURE 26 is a rear elevation, as viewed by the operator, of the slave pivot assembly.
Figure 33:
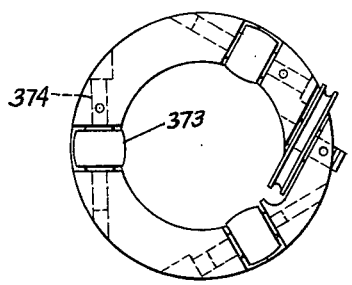
FIGURE 33 is a bottom plan view of the intermediate tube assembly.
Figure 28:
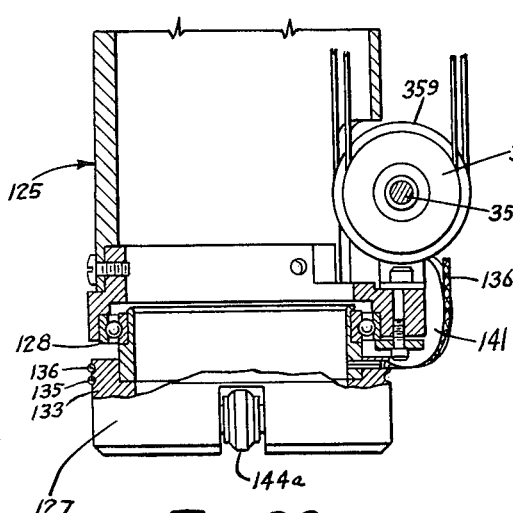
FIGURE 28 is a left elevation, partly in section, of the slave azimuth assembly.
Figure 29:
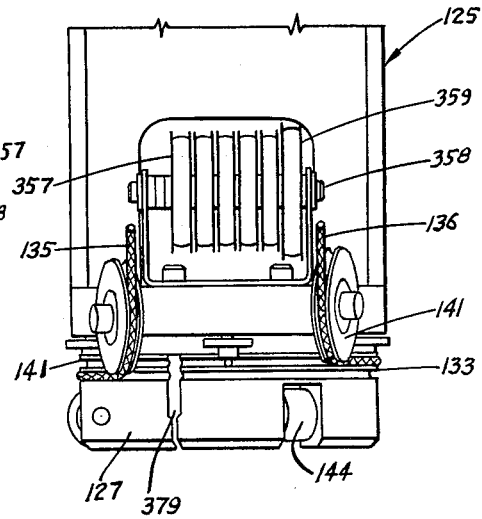
FIGURE 29 is a front elevation of the slave azimuth assembly.
Figure 30:
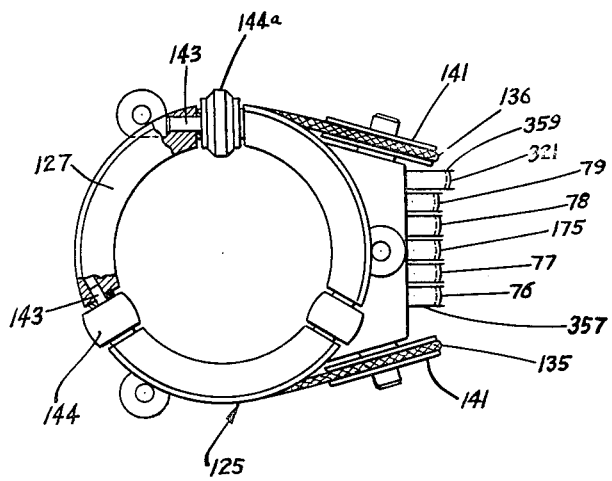
FIGURE 30 is a bottom plan view of the slave azimuth assembly.
Figure 35:
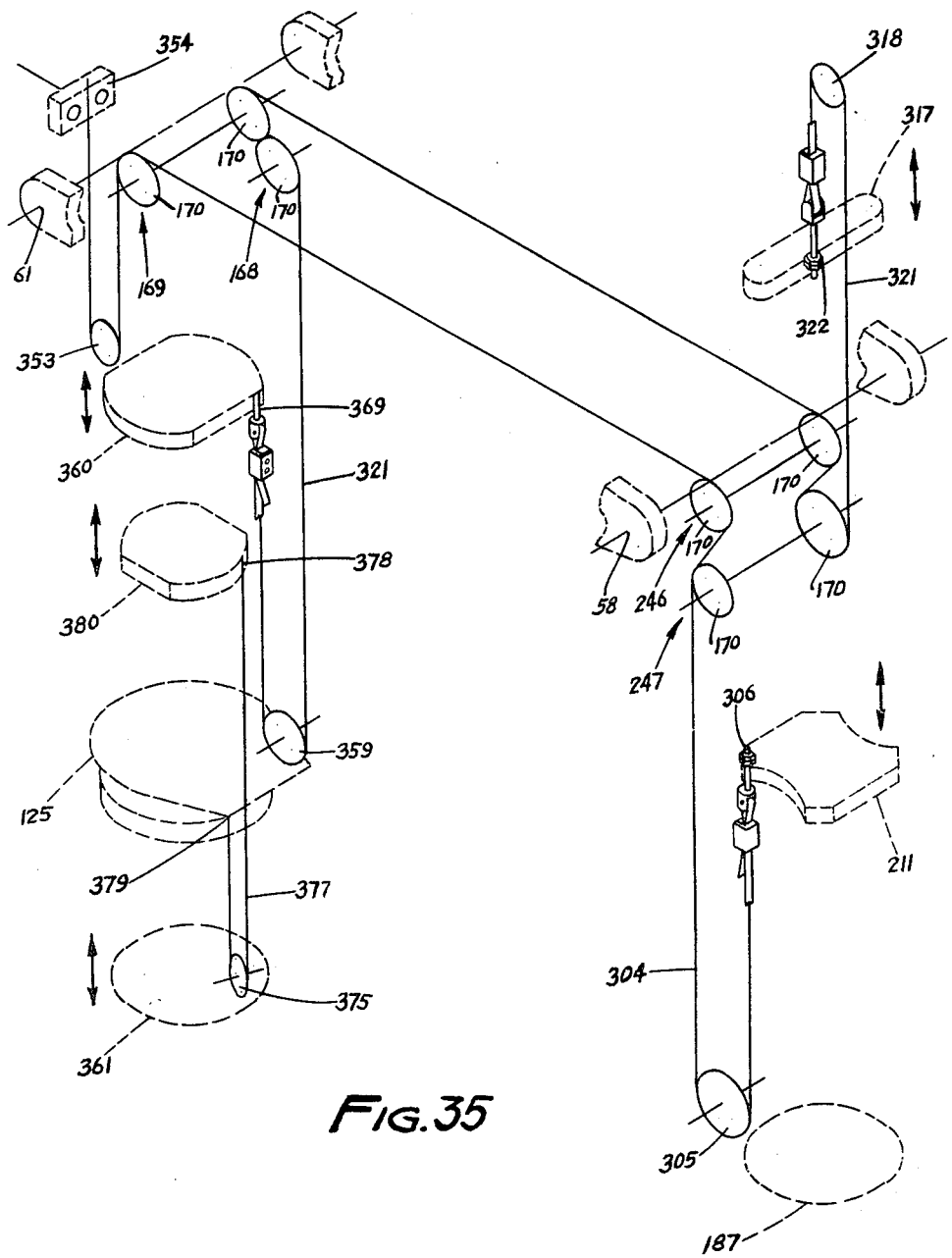
FIGURE 35 is a schematic perspective view showing how vertical movement of the master arm handle produces a corresponding vertical movement (or Z motion) in the tong at the end of the slave arm.

The means by which the master arm is connected to the horizontal support is shown generally in FIGURES 22 and 23 and the construction of the master pivot assembly is shown in FIGURES 24 and 25. A pair of ears 177 are adapted to be attached to one end of the horizontal support 50 by means of screws 178 and locating pins 179 (FIGURES 4 and 5). The ears 177 project beyond the end of the horizontal support and carry stub shafts 180 upon which a frame 181 is journaled by means of ball bearings 182. The shafts 180 have their axis coincident with the pivot 58 of the master arm 51 on the horizontal support 50. The frame 181 forms a part of the stationary part or trunk tube 56 of the master arm 51 and is provided with a pair of parallel spaced apart recesses adapted to receive the vertical tubular guides 185.

A rocker member 257 is pivoted by means of ball bearings 255 on hubs 256 between the ears 177. A pair of counterweight arms 254 and 254a are secured to the rocker hubs 256 to pivot therewith. Counterweights 349 as required are carried at the ends of vertically upstanding arms 254 and 254a. Arm 254a is provided with a bracket 350 to which a link (such as actuator 385, FIGURE 3) is secured for the purpose of imparting the Y motion of the master arm to the rocker. Shafts 282 are carried in the top and bottom portions of the rocker member 257 for the purpose of providing a pivotal connection with the rod ends 278 and 279 of tie rods 280 and 281, respectively, to transmit Y motion to the slave arm.

It will readily be seen that the counterweights 349 assist in counter-balancing the manipulator in Y motion as the arms are moved on their pivots toward and away from the shielding wall. The ears 177 are maintained in their spaced apart relation by means of a plate 351 extending between the ears toward the outer ends.

The pivot assembly frame 181 supports two banks of pulleys, an upper bank 246 and a lower bank 247, each comprised of a plurality of tape pulleys 170 and cable pulleys 171. The upper pulley bank 246 is located near the master arm pivot 58 so that the upper peripheral portions of the pulleys 170 and 171 are approximately tangent to the pivot axis and the shaft 248 mounting the pulley bank lies directly below the pivot axis. The lower pulley bank 247 lies below the upper pulley bank 246 and is carried on shaft 249 which lies directly below shaft 248. Fittings are provided for a projecting pin or lug 352 which is used as a pivotal connection for one end of the Y motion link.

SLAVE PIVOT ASSEMBLY

(FIGURES 6, 7, 26 and 27)

The stationary part or trunk tube 59 of the slave arm is connected to the horizontal tubular support 50 for movement about a pivot 61. The attachment means include a frame structure 116 secured to the upper end of the tubular slave trunk tube 59. Framework 116 includes a pair of vertical side pieces 115 joined together at their top ends by a horizontal cross-piece 120. The stub shafts 108a of the yoke 111 of the horizontal tubular support 50 are journaled in bearings 110 carried by the vertical side pieces 115 of the frame 116. Tie rod 280 is connected to frame 116 through a pin or shaft 286 in the upper part of the frame 116. Tie rod 281 is similarly connected to a shaft 287 below the main slave pivot 61.

The slave arm pivot structure includes a lower bank of pulleys 168 and an upper bank of pulleys 169 comprised of a plurality of tape pulleys 170 and cable pulleys 171 journaled for rotation on a common axis. The upper pulley bank 169 is mounted on a fixed shaft 172. The lower pulley bank 168 is mounted on a pivot shaft 287 to which tie rod 281 is pivotally connected.

The azimuth cables 135 and 136, elevation and twist motion tapes 76–79, tong tape 175 and Z motion tape 321 extend around the pulleys of the upper bank 169 in their paths from the horizontal support tube, and then over and around the pulleys of the lower bank 168 in their paths downward to the specific mechanisms of the slave arm, as more fully described hereinafter. Z motion tape 304 passes around a pulley 170 of the upper pulley bank 169 in its path from the horizontal support tube 50, but then passes downwardly to pulley 353 in the slave arm intermediate tube 59A and thence back upwardly to an anchorage 354 in the pivot framework 116.

Upper pulley bank 169 is mounted so that the upper peripheral portions of the pulleys 170 and 171 are approximately tangent to the pivot axis 61. The lower pulley bank 168 is displaced toward the shielding wall so as to carry the tape and cables along the outside of the trunk tube.

SLAVE AZIMUTH ASSEMBLY

(FIGURES 6, 7, 28, 29 and 30)

A slave azimuth body in the form of a bracket 125 is secured to the lower end of the slave trunk tube 59. A rotating body or ring 127 is rotatably mounted within the bracket 125 by means of a bearing 128. The lower end of the ring 127 provides mountings for shafts 143 which carry rollers 144 and 144a. The rollers 144 engage the outside surfaces of tube 355 of intermediate tube assembly 59A and roller 144a engages the groove 356 formed in the tube 355 to cause ring 127 to rotate with the intermediate tube assembly. The roller 144a constitutes a means for keying the slave arm boom tube 60 to the ring 127 through intermediate tube 59A whereby a rotational movement of the boom tube 60 with respect to the ring 127 is prevented while axial movement of the boom tube with respect to the ring is permitted.

The slave azimuth body is provided with a cable take-up member in the form of a double grooved pulley 133 which receives azimuth motion cables 135 and 136 whose ends are secured by anchoring to the pulley and whose opposite ends extend to the master azimuth assembly. Pulley 133 is mounted on ring 127 to rotate therewith.

Cables 135 and 136 are wrapped around the double grooved pulley in opposite directions. As one cable is wrapped about the pulley in the operation of the manipulator, the other is unwrapped. This movement of the cables causes rotation of the rotary ring member 127 and, through the keying roller 144a, causes rotation of the intermediate tube 59A and the slave arm boom tube and the wrist joint and tong assemblies at the end thereof. Cables 135 and 136 are moved in response to corresponding movement of the master arm azimuth assembly and transmit the rotary motion of the master arm about its longitudinal axis to produce a corresponding rotation of the slave arm about its longitudinal axis.

Cables 135 and 136 whose ends are anchored in the double grooved pulley 133 pass over grooved guide pulleys 141 and then upward toward the pulley banks associated with the pivot 61 of the slave arm on the horizontal support.

The elevation and twist motion tapes 76–79 and tong tape 175 from the slave pivot pulley banks run over pulleys 357 which are journaled to rotate on shaft 358 mounted in the bracket. Bank of pulleys 357 are mounted so as to pass the tapes from outside of the slave arm trunk tube to the intermediate slave tube assembly telescoped within the trunk tube. A further pulley 359 is mounted on shaft 358 to guide Z motion tape from the outside of the slave arm trunk tube in its passage from the slave pivot pulley banks to the slave intermediate tube.

SLAVE ARM INTERMEDIATE TUBE (FIGURES 6, 7, 31, 32 and 33)

Slave arm intermediate tube 59A is telescoped within boom tube 59 and is movable with respect to the trunk tube, both along and rotationally about the longitudinal axis of the slave arm. The intermediate tube assembly includes a relatively elongated hollow tube 355 having a carriage body 360 at its top end and a guide bracket 361 mounted at its bottom end. Body 360 is journaled for rotation with respect to tube 355 by means of a bearing 362 held in an adapter and retainer member 363 at the top of tube 355.

The guide bracket 360 is provided with a plurality of rollers 364 each journaled for rotation on a shaft 365. Rollers 364 bear against the inner wall of slave arm trunk tube 59 and guide the intermediate tube in its vertical movement. Guide bracket 360 also carries a plurality of pulleys 366 mounted for rotation about shaft 367 for guiding elevation and twist motion tapes 76–79 and tong tape 175 in their paths between the slave azimuth assembly and the slave wrist joint.

Pulley 353 which guides Z motion tape 304 in its path from the slave pivot pulley bank to its anchorage 354 in the slave pivot bracket is journaled on shaft 368 in the upper part of carriage body 360. An anchorage 354 (FIGURE 26) secures the slave end of Z motion tape 304 to the slave pivot frame 116. A track roller 370 is journaled in the carriage body to rotate on shaft 371. Track roller 370 is positioned on the opposite side of the carriage from the bank of pulleys and engages a vertical track 372 (FIGURE 6) on the inside of the slave trunk tube 59 for the purpose of preventing rotation of the intermediate tube carriage body 360 relative to the slave trunk tube. The remainder of the intermediate tube assembly may rotate in bearing 362 in response to movement of the rotatable ring member 127 of the slave azimuth assembly (in response to movement of the azimuth cables) to reproduce motions of the master arm in the slave arm.

The guide bracket 361 is secured for both vertical and rotational movement with the intermediate tube assembly. The guide bracket is in the form of a ring. A plurality of rollers 373 each mounted for rotation about a shaft 374 are provided about the inner periphery of the guide bracket to bear against the outer surface of the slave arm boom tube 60 to assist in guiding it in its vertical movement relative to the remainder of the slave arm. A guide pulley 375 is journaled for rotation on shaft 376 on the bottom guide bracket 361. The peripheries of the pulley 375 extend through the guide bracket so as to pass a Z motion cable 377 around the end of the intermediate tube wall in the passage of that cable from its anchorage 378 at the top of the slave arm boom tube to its other anchorage 379 in the slave arm azimuth assembly.

The upper end of the slave boom tube 60 is fitted with a carriage 380 secured thereto (FIGURE 7). Boom tube carriage 380 is provided with a plurality of guide rollers 381 which bear against the inner surface of the intermediate tube and a track roller 382 which engages vertical track 383 on the inside of the intermediate tube. Engagement of track 383 by track roller 382 insures that the slave arm boom tube 60 will be rotated about the longitudinal axis of the slave arm along with the intermediate tube assembly while permitting relative vertical movement of the boom tube with respect to the intermediate tube.

MASTER BOOM TUBE COUNTERBALANCE SCHEMATIC (FIGURE 34)

In order that the master arm boom tube will remain in any position relative to the master trunk and may be retracted or extended with minimum exertion on the part of the operator, it is counterbalanced, as shown schematically in FIGURE 34. At the same time, the length of the paths of travel of tapes and cables associated with the master arm boom tube and moved with that tube is maintained uniform by compensating for the distance through which the boom tube is moved by means of the half-speed carriage assembly.

Figure 36:
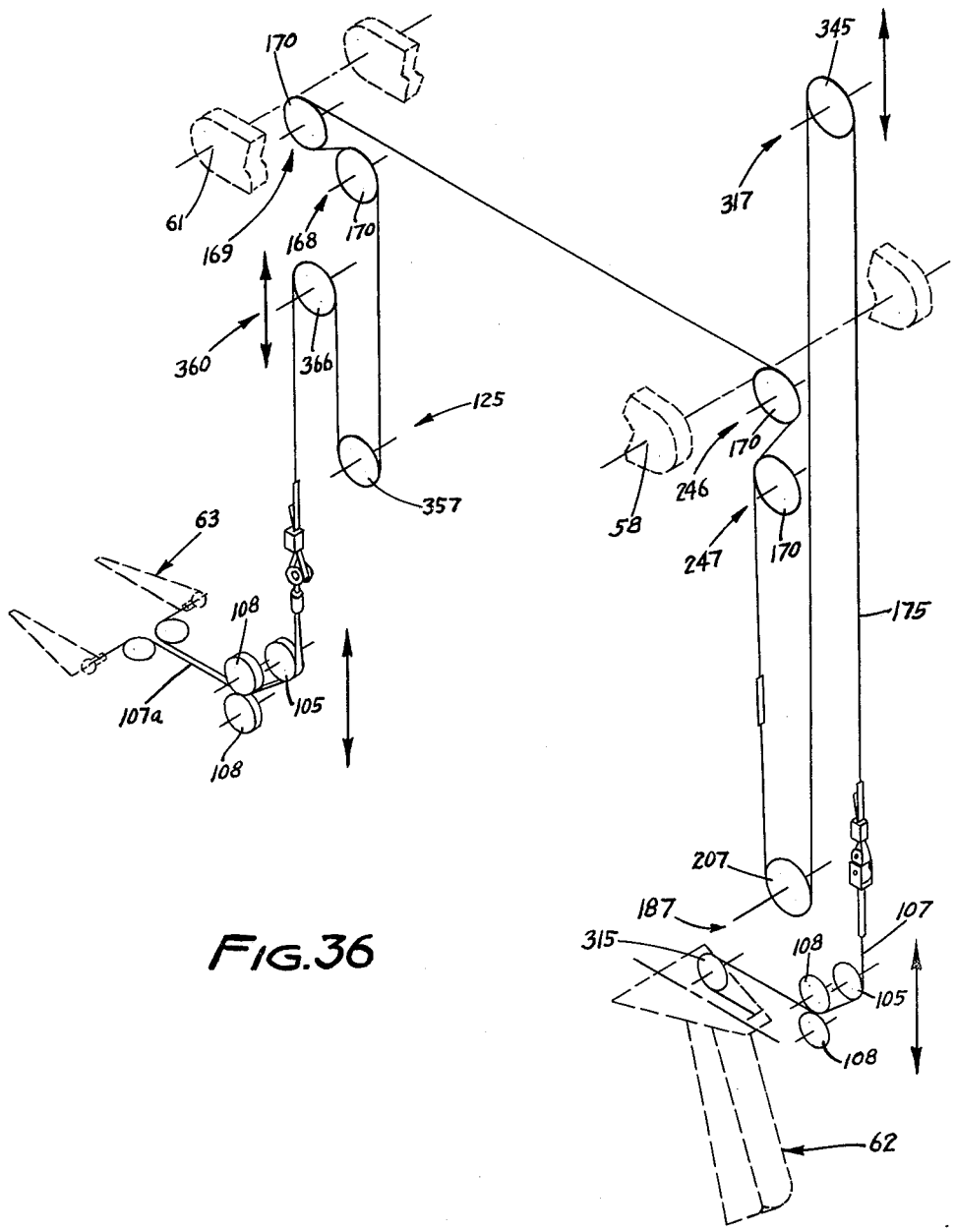
FIGURE 36 is a schematic perspective view showing how manipulation of the handle on the master arm causes opening and closing of the tongs carried by the slave arm.

Counterweights 233 are suspended within tubular guides 185 by means of tapes 222 and 223 which pass over fixed pulleys 230 in the counterweight bracket assembly at the top of the master arm trunk tube. The ends of tapes 222 and 223 are secured in anchorages at 316 in the half-speed carriage assembly 317, which moves longitudinally between the tubular guides 185 of the master arm trunk tube in the same direction but at one-half the speed of the master arm boom tube. Tapes 160 and 161 are attached at anchorages 303 at the top of the master arm boom tube for longitudinal movement therewith. Tapes 160 and 161 extend downwardly and around fixed pulleys 242 on the master azimuth assembly at the bottom end of the master arm trunk tube. Tapes 160 and 161 then extend upwardly and around pulleys 339 fixed to the counterweights 233 and downwardly again where their opposite ends are fixed at anchorages 338 in the master azimuth bracket. Elevation and twist tapes 76–79 and tong tape 175 all extend over the half-speed carriage pulley bank in their paths between the fixed handle end of the boom tube and the fixed upper pivot pulley bank (FIGURES 36 and 38). These tapes provide the counterforce which enables the half-speed carriage to remain suspended in the upper portion of the trunk tube.

As the boom tube is lowered, that is, extended out of the trunk tube, it moves at a given rate with respect to the fixed trunk tube. At the same time, the half-speed carriage 317 moves in the same direction but at one-half the speed and over one-half the distance. The counterweights 233 which travel in the tubular guides of the trunk tube, move in the opposite direction and at one-half the rate of speed of movement of the boom tube. The slave arm is independently counterbalanced in the same manner as described generally in the copending application of Jelatis et al., Serial No. 98,372 filed March 27, 1961, now Patent No. 3,164,267.

Z MOTION SCHEMATIC (FIGURE 35)

The transfer of the extending and retracting movement or Z motion of the master boom tube to the slave boom tube is simultaneous with, but independent of, movement of the counterbalance systems. One tape 304 extends from an anchorage at 306 at the top 211 of the master arm boom tube downwardly over fixed pulley 305 carried by the azimuth assembly at the bottom end of the master arm trunk. Tape 304 then passes upwardly past pulley 170 of the lower master pivot pulley bank 247 and over pulley 170 of the upper pivot pulley bank 246, through horizontal support 50 to pulley 170 of the upper slave pivot pulley bank 169, down and around pulley 353 fixed in the carriage 360 of the slave arm intermediate tube, and upwardly to an anchorage 354 in the slave pivot bracket. Another tape 321 is secured at 369 to the carriage 360 of the slave arm intermediate tube.

Tape 321 extends downwardly and is guided over an idler 359 in the slave azimuth bracket and then upwardly around the pulleys 170 of the lower slave pivot pulley bank 168 and upper slave pivot pulley bank 169. From the slave pivot pulleys, tape 321 extends through horizontal support 50 to the master pivot pulleys, passing over pulley 170 of the upper bank 246, down and around pulley 170 of the lower bank 270, upwardly to pulley 318 fixed in the master arm counterweight assembly and thence down to an anchorage 322 in the half-speed carriage assembly 317. This later arrangement insures positive downward movement of the slave arm intermediate tube in spite of the position of the slave arm relative to true vertical.

As the master boom tube is lowered, that is extended from the trunk, tension on tape 304 is relaxed and this relaxation of tension is transmitted through the horizontal support to the slave arm where the weight of the intermediate tube held suspended in a loop of tape by virtue of pulley 353 (and/or the force on tape 321) takes up the relaxed tension to maintain the tape taut. As the master boom tube is lowered further the weight of the slave intermediate tube (and/or tape 321) causes the loop of tape between the anchorage 354 and pulley 170 of upper slave pivot pulley bank 169 to be extended by a distance equal to one-half of the movement of the master boom tube.

As the slave intermediate tube is extended, tension on tape 321 is relaxed and this corresponding relaxation in tension is taken up by the forces exerted upon the master half-speed carriage 317 by the downward movement of the master boom tube. The slave intermediate tube and master half-speed carriage move at the same speed. As the slave intermediate tube is extended from the slave trunk tube in which it is telescoped, the slave boom tube is extended at the same time from the slave intermediate tube in which it is telescoped.

The slave boom tube is tied to the slave intermediate tube for movement in the Z motion by means of cable 377, one end of which is anchored at the top of the slave boom tube at 378 and the other end of which is anchored to the slave azimuth bracket at 379 after passing around pulley 375 in the carriage at the bottom of the slave intermediate tube. Thus, as the intermediate tube is extended, force is exerted by means of pulley 375 on cable 377. This force is transmitted through the cable 377 to the top of the slave boom tube pulling it downwardly and causing the boom tube to be extended relative to the intermediate tube. The extent of movement of the slave boom tube is twice that of the slave intermediate tube relative to the fixed slave boom tube and equals that of the master boom tube. That is, the combined extension of the slave intermediate tube and slave boom tube equals that of the master boom tube. It will be observed that the slave boom tube will travel twice as fast as the intermediate tube relative to the slave trunk tube.

TONG MOTION SCHEMATIC

(FIGURE 36)

As shown schematically in FIGURE 36, the squeezing motion of the operator on the handle means 62 of the master arm is transmitted to the tong means 63 on the slave arm. As fully described in the aforementioned Goertz et al. United States Patent No. 2,695,715, squeezing of the handle 62 through direct linkage exerts tension from cable 107 on tape 175 which is transmitted through the tape. Tape 175 passes over pulley 345 carried in the half-speed carriage assembly 317 (which is movable between the tubular guides 185 of the master arm trunk tube), down and around pulley 207 (whose location is fixed as part of the master azimuth assembly), up and over pulleys 170 (in the master arm pivot pulley banks) through horizontal support 50. From the horizontal support the tape 175 passes over pulleys 170 of the upper and lower slave arm pivot pulley banks and down and around a pulley 357 (located in the azimuth assembly of the slave arm trunk tube). Tape 175 then passes up and over pulley 366 supported in the slave arm intermediate tube (half-speed) carriage, and, thence, downwardly to the tong mechanism 63 at the end of the slave arm boom tube. Through direct linkage, as disclosed in the aforementioned Goertz et al. patent, the tension transmitted by tape 175 to cables 107a causes the tong elements to move in order to grasp an object to be acted upon. Spring means in the tong assembly open the tongs upon release of tension from the handle.

AZIMUTH MOTION SCHEMATIC

(FIGURE 37)

In FIGURE 37 there is shown schematically the manner in which the rotation of the master arm boom tube about its longitudinal axis causes corresponding rotation of the slave arm boom tube and intermediate tube. As the handle member 62 is moved in an arc about the longitudinal axis of the master arm this motion is transmitted through the wrist joint to the master arm boom tube 57. Because the master arm boom tube 57 is keyed against rotation relative to the ring 190 of the master azimuth assembly by virtue of the keying rollers 199, rotation of the master arm boom tube causes corresponding rotation of the ring 190 which carries the double grooved pulley 133. The cables 135 and 136 are wrapped about that pulley in opposite directions. Thus, as pulley 133 is rotated in a right-to-left direction, as viewed by the operator, tension is exerted on cable 136 as it is caused to wind farther onto the pulley. This tension is transmitted by the cable in its path up and over guide pulley 205, up and around guide pulleys 171 of the lower and upper pivot pulley banks of the master arm, through the horizontal support, around the corresponding guide pulleys 171 of the upper and lower pivot pulleys banks of the slave arm and down to double grooved pulley 133 of the slave azimuth assembly where the tension on the tape caused rotation of the pulley.

The rotation of the double grooved pulley 133 is in a right-to-left direction, as viewed by the operator, and, thus, causes an unwinding of tape 136 from double grooved pulley 133. This causes a corresponding winding of tape 135 about the pulley which exerts tension on that tape which is transmitted along the tape in its path up the slave arm, around the guide pulleys, through the horizontal support, around the guide pulleys and down to the master azimuth assembly where the opposite end of the tape is unwound the corresponding amount from the double grooved pulley 202. The rotation of pulley 133 causes rotation of the slave azimuth ring member 127 intermediate tube 59A and slave arm boom tube 60.

ELEVATION AND TWIST MOTION SCHEMATIC

(FIGURE 38)

The system by which elevation and twist motions are transmitted from the handle 62 to the tong 63 is illustrated schematically in FIGURE 38. One end of tape 76 is secured to take-up means 75 associated with the wrist joint and handle mechanism, which is rotated in response to manipulation of the handle by the operator through direct gearing, as described in the aforesaid Goertz et al. United States Patent 2,695,715.

As take-up means 75 is rotated in a counterclockwise direction, as viewed in FIGURE 38, tape 76 is wound about that drum. This exerts tension upon the tape which is transmitted through the tape in its path up and over pulleys 345 (in the half-speed carriage 317), down and around pulley 207 (located in the master azimuth bracket at the bottom end of the trunk tube), up and around pulley 170 (located in the upper master pivot pulley bank) and thence through the horizontal support.

From the horizontal support tape 76 extends over and around pulleys 170 of the upper and lower slave pulley banks, down and around pulley 357 in the azimuth assembly at the lower end of the slave arm trunk tube, up and over pulley 366 on the slave arm intermediate tube (half-speed) carriage 360 and thence, down to drum 75 of the slave arm wrist joint mechanism to which the end is secured. The force transmitted by tape 76 causes drum 76 to be rotated in a counterclockwise direction corresponding in rate and extent of rotation to the rotation of drum 75 on the master arm.

Tape 77 extends around drum 75 of the slave wrist joint in the opposite direction from tape 76. The end of tape 77 is attached to the drum. Thus, when drum 75 is rotated in a counterclockwise direction (caused by the unwinding of tape 76) tension is exerted by the drum 75 on tape 77 to wind that tape further onto drum 75. This force is transmitted by the tape along its path of travel up and over pulley 366 on the interemdiate tube (half-speed) carriage 360, down and under pulley 357 (located in the slave azimuth assembly), up and over pivot pulleys 170 and through the horizontal support.

From the horizontal support the force is exerted through the tape along its path over pulley 170 in the upper master pivot pulley bank, down and around pulley 207 in the master trunk tube azimuth assembly, up and over half-speed carriage pulley 345 to drum 75 of the master arm wrist joint to which the end of tape 77 is wrapped in the opposite direction and is secured. As drum 75 rotates in a counterclockwise direction to wind tape 76 onto it, tape 77 is unwound to the same extent.

The tapes 79 and 78 follow similar paths and function similarly to tapes 76 and 77. The motions of the operator in moving the handle means about the axes of rotation of trunnions 95 and shaft 97 are reproduced in the tong means of the slave arm.

Each of the motion systems has been described in connection with the schematic illustrations as moving in a single direction. The operation of the systems to accomplish movement in the opposite direction will be readily apparent. It will also be apparent that, in actual operation of the manipulator device, two or more of the motion systems will be in simultaneous but independent operation.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A compact master-slave remote-control manipulator adapted for full range operation with minimum head space requirements in the slave compartment, said manipulator comprising a horizontal support, a master arm pivotally connected to one end of said support and a slave arm pivotally connected to the other end of said support, handle means at the lower end of said master arm and grasping means at the lower end of said slave arm moveable in response to manipulations of said handle means; said master arm including a relatively stationary portion fixed relative to movement along its longitudinal axis and an elongated moveable portion rotatable relative to said stationary portion of the master arm and moveable longitudinally relative thereto; said slave arm including a relatively stationary portion comprising an outer tube fixed relative to movement along its longitudinal axis, an intermediate tube telescoped within said outer tube, said intermediate tube being rotatable relative to said outer tube and moveable longitudinally relative thereto, and an inner tube telescoped within said intermediate tube, said inner tube being rotatable with the intermediate tube and moveable longitudinally relative thereto; the relatively moveable portions of said slave arm being extensible and retractable in response to like movement of the relatively moveable portion of the master arm, the combined movement of the moveable portions of the slave arm being equal in extent to the movement of the moveable portion of the master arm.

2. A manipulator according to claim 1 further characterized in that the relatively stationary portions of the master and slave arms are linked together for movement together about their pivotal connections to the opposite ends of the horizontal support by means of at least two substantially rigid elongated parallel tie rod members extending through the horizontal support disposed in a parallelogram configuration bisected by the axis of rotation of the horizontal support, the tie rod members at one end being pivotally connected to the stationary portion of the slave arm on axes parallel to and spaced on opposite sides of the pivotal axis of rotation of the slave arm relative to the horizontal support, the tie rod members at the opposite end being pivotally connected to a rocket member on parallel axes spaced from the pivotal axis of rotation of the master arm relative to the horizontal support, said rocket member being linked to the stationary portion of the master arm for movement therewith.

3. A manipulator according to claim 1 further characterized in that said master arm includes independent counterweight means mounted for movement with the moveable portion of said master arm relative to the stationary portion thereof but in the opposite direction, the moveable portion of said master arm being supported by being suspended from the top of said stationary portion from linear motion transmission means whose opposite end suspends said counterweight means, and further linear motion transmission means extending around the stationary portion of the master arm connecting said counterweight means and said moveable portion of the master arm in a closed loop.

4. A remote-control master-slave manipulator adapted for operation through a barrier wall and including a pivoted master arm assembly adapted to be positioned on one side of a barrier wall, a pivoted slave arm assembly adapted to be positioned on the other side of the barrier wall, a tubular support adapted to extend through the barrier wall between the master and slave assemblies, said master arm and slave arm assemblies each including a pivotally supported stationary fixed relative to movement along its longitudinal axis and a boom tube portion telescopically moveable for both longitudinal and rotational movement therein, a plurality of linear motion transmission means operatively connected through said tubular support to transmit manipulator motions of said master arm assembly to said slave arm assembly, a half-speed carriage assembly supported within each of the stationary portions of said master and slave arm assemblies for movement therein in the same direction as and at one half the speed of movement of said boom tubes, each half-speed carriage assembly including a pulley bank comprised of a plurality of pulleys, said linear motion transmission means extending over the pulleys of said pulley bank in their paths of travel between the tubular support and manipulator mechanisms at the bottom ends of said boom tubes, the half-speed carriage of the slave arm comprising an elongated intermediate tube assembly fitted telescopically within the stationary portion of the slave arm assembly for longitudinal movement relative thereto and having the slave arm boom tube portion fitted telescopically therein for longitudinal movement relative thereto.

5. A compact master-slave remote-control manipulator adapted for full range operation with minimum headspace requirements in the slave compartment, said manipulator comprising a horizontal support, a master arm pivotally connected to one end of said support and a slave arm pivotally connected to the other end of said support, handle means at the lower end of the master arm and grasping means at the lower end of the slave arm moveable in response to manipulations of the handle means; said master arm including a relatively stationary portion fixed relative to movement along its longitudinal axis, an elongated moveable portion moveable longitudinally relative thereto and a half-speed carriage supported above and moveable with said moveable portion; said slave arm including an outer tube fixed relative to movement along its longitudinal axis, an intermediate tube telescoped within said outer tube and moveable longitudinally relative thereto and an inner tube telescoped within said intermediate tube and moveable longitudinally relative thereto; the longitudinal movements of said inner and intermediate tubes of the slave arm being responsive to and the total movement of said inner tube being equal in extent to the movement of the moveable portion of the master arm; said inner tube and intermediate tube being linked together for movement at different relative speeds by linear motion transmission means anchored in said inner and outer tubes and extending around an idler means journalled adjacent the bottom of said intermediate tube; said intermediate tube and moveable master arm portion being linked together for movement at different relative speeds in one direction by linear motion transmission means anchored adjacent the top of said outer tube, extending around an idler means journalled adjacent the top of said intermediate tube and the pivotal connections of said arms to the horizontal support and an idler means journalled adjacent the bottom of the stationary portion of the master arm and anchored adjacent the top of the moveable portion of the master arm, and for movement in the opposite direction by linear motion transmission means anchored adjacent the top of said intermediate tube, extending around an idler means journalled adjacent the bottom of said outer tube and the pivotal connections of said arms to the horizontal support and an idler journalled adjacent the top of the stationary portion of the master arm and anchored in said half-speed carriage.

6. A manipulator according to claim 5 further characterized in that said half-speed carriage of the master arm is suspended above the elongated moveable portion of the master arm for movement therewith at one half the speed and over one half the distance and is supported in part by said linear motion transmission means anchored therein and in part by weighted counterbalance means for said elongated moveable portion of the master arm.

7. A manipulator according to claim 5 further characterized in that the moveable portions of said master arm and slave arm are independently counterbalanced.

8. A manipulator according to claim 5 further characterized in that the moveable portion of the master arm is rotatable relative to the stationary portion of the master arm as well as moveable longitudinally and the intermediate tube of said slave arm is rotatable relative to the outer tube as well as moveable longitudinally.

References Cited by the Examiner
UNITED STATES PATENTS

| | | | |
|---|---|---|---|
| 2,764,301 | 9/1956 | Goertz et al. | 214—1 |
| 2,771,199 | 11/1956 | Jelatis | 214—1 |
| 3,065,863 | 11/1962 | Saunders | 214—1 |

GERALD M. FORLENZA, *Primary Examiner.*

HUGO O. SCHULZ, *Examiner.*

R. G. SHERIDAN, *Assistant Examiner.*